(12) United States Patent
Ito

(10) Patent No.: US 10,948,786 B2
(45) Date of Patent: Mar. 16, 2021

(54) ELECTRO-OPTICAL DEVICE, ELECTRONIC APPARATUS, AND METHOD FOR MANUFACTURING ELECTRO-OPTICAL DEVICE

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/791,142

(22) Filed: Feb. 14, 2020

(65) Prior Publication Data
US 2020/0264482 A1   Aug. 20, 2020

(30) Foreign Application Priority Data

Feb. 15, 2019  (JP) .............................. JP2019-025271

(51) Int. Cl.
| | |
|---|---|
| *G02F 1/1343* | (2006.01) |
| *G02F 1/1333* | (2006.01) |
| *G09G 3/296* | (2013.01) |
| *G02F 1/1362* | (2006.01) |
| *G09G 3/36* | (2006.01) |

(52) U.S. Cl.
CPC .... *G02F 1/134336* (2013.01); *G02F 1/13624* (2013.01); *G02F 1/133345* (2013.01); *G09G 3/296* (2013.01); *G09G 3/3648* (2013.01); *G02F 2201/123* (2013.01); *G09G 2300/0426* (2013.01); *G09G 2300/08* (2013.01)

(58) Field of Classification Search
CPC .......... G02F 1/13624; G02F 1/134336; G02F 1/133345; G02F 2201/123; G09G 3/296; G09G 3/3648; G09G 2300/08; G09G 2300/0426
USPC ........................................................ 349/139
See application file for complete search history.

(56) References Cited

U.S. PATENT DOCUMENTS

| | | |
|---|---|---|
| 2004/0241987 A1 | 12/2004 | Kim et al. |
| 2006/0024948 A1 | 2/2006 | Oh et al. |
| 2006/0138424 A1 | 6/2006 | Kim et al. |

(Continued)

FOREIGN PATENT DOCUMENTS

| | | |
|---|---|---|
| JP | H09-230371 A | 9/1997 |
| JP | 2001-257355 A | 9/2001 |

(Continued)

*Primary Examiner* — Nathanael R Briggs
*Assistant Examiner* — William D Peterson
(74) *Attorney, Agent, or Firm* — Oliff PLC

(57) ABSTRACT

An electro-optical device includes a base material having translucency, a pixel electrode having translucency, a switching element electrically coupled to the pixel electrode, and a circuit configured to drive the switching element. The base material includes a first recessed portion, a second recessed portion, a first light-shielding body that is disposed in the first recessed portion, comes into contact with the base material, and overlaps the switching element in plan view from a thickness direction of the base material, and a second light-shielding body that is disposed at the second recessed portion, comes into contact with the base material, and overlaps the circuit in the plan view. A thickness of the first light-shielding body and a thickness of the second light-shielding body are different from each other.

13 Claims, 13 Drawing Sheets

(56) References Cited

U.S. PATENT DOCUMENTS

2006/0145281 A1    7/2006   Jiroku
2008/0145980 A1    6/2008   Kim et al.

FOREIGN PATENT DOCUMENTS

| JP | 2005-510064 A | | 4/2005 |
|---|---|---|---|
| JP | 2005-250234 A | | 9/2005 |
| JP | 2005250234 A | * | 9/2005 |
| JP | 2006-041519 A | | 2/2006 |
| JP | 2006-190836 A | | 7/2006 |
| JP | 2010-014755 A | | 1/2010 |
| JP | 2013-015680 A | | 1/2013 |
| JP | 2016-033680 A | | 3/2016 |

* cited by examiner

ELECTRO-OPTICAL DEVICE, ELECTRONIC APPARATUS, AND METHOD FOR MANUFACTURING ELECTRO-OPTICAL DEVICE

The present application is based on, and claims priority from JP Application Serial Number 2019-025271, filed Feb. 15, 2019, the disclosure of which is hereby incorporated by reference herein in its entirety.

BACKGROUND

1. Technical Field

The present disclosure relates to an electro-optical device, an electronic apparatus, and a method for manufacturing an electro-optical device.

2. Related Art

There have been known electro-optical devices, such as liquid crystal devices. Liquid crystal devices have been used as, for example, light valves for projectors. JP-A-2005-250234 discloses an electro-optical device including an element substrate, a counter substrate, and a liquid crystal disposed therebetween. The element substrate includes a quartz substrate, a plurality of pixel electrodes separated from the quartz substrate and disposed in a matrix pattern, and a thin film transistor (TFT) disposed in correspondence with each pixel electrode. Further, the element substrate described in JP-A-2005-250234 includes a light-shielding film constituted by a metal or the like to suppress the incidence of light on the TFT.

To enhance the light shielding property with respect to the TFT, it is conceivable to increase a thickness of the light-shielding film. Further, in addition to the TFT, for example, it is desirable to suppress the incidence of light on a circuit or the like configured to drive the TFT. Therefore, in addition to the light-shielding film disposed in correspondence with the TFT, a light-shielding film disposed in correspondence with the circuit or the like needs to be provided. However, when the light-shielding film is thickened or the number of disposed locations of the light-shielding film is increased, a stress generated in a base material becomes excessively large when the thickness of the light-shielding film is uniform. As a result, warping of the base material increases. Therefore, in an element substrate in the related art, the problem arises that it is difficult to enhance the light shielding property with respect to the TFT and the like while suppressing an increase in warping of the base material.

SUMMARY

According to an aspect of the present disclosure, an electro-optical device includes a base material having translucency, a pixel electrode having translucency, a switching element electrically coupled to the pixel electrode, and a circuit configured to drive the switching element. The base material includes a first recessed portion, a second recessed portion, a first light-shielding body that is disposed in the first recessed portion, comes into contact with the base material, and overlaps the switching element in plan view from a thickness direction of the base material, and a second light-shielding body that is disposed in the second recessed portion, comes into contact with the base material, and overlaps the circuit in the plan view. A thickness of the first light-shielding body and a thickness of the second light-shielding body are different from each other.

According to an aspect of the present disclosure, a method for manufacturing an electro-optical device includes preparing a base material having translucency, forming a first recessed portion and a second recessed portion in the base material, forming in the first recessed portion a first light-shielding body that comes into contact with the base material and forming in the second recessed portion a second light-shielding body that comes into contact with the base material, and forming at the base material a pixel electrode having light translucency, a switching element electrically coupled to the pixel electrode, and a circuit configured to drive the switching element. The first light-shielding body overlaps the switching element in plan view from a thickness direction of the base material, the second light-shielding body overlaps the switching element in the plan view, and a thickness of the first light-shielding body and a thickness of the second light-shielding body are different from each other.

DESCRIPTION OF EXEMPLARY EMBODIMENTS

Figure 1:
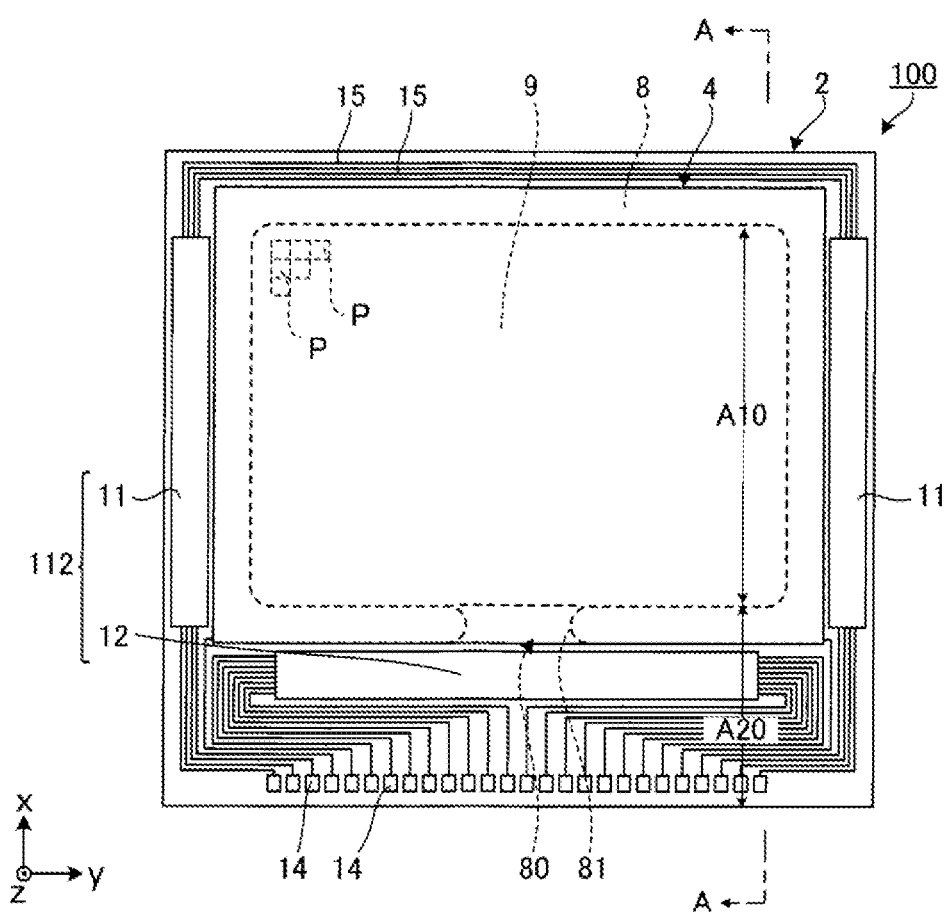
FIG. 1 is a plan view of an electro-optical device according to a first exemplary embodiment.

Preferred exemplary embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these embodiments unless otherwise stated to limit the present disclosure in the following descriptions.

1. Electro-Optical Device

1-1. First Exemplary Embodiment

As an example of an electro-optical device of the present disclosure, an active matrix type liquid crystal display device will be described.

1-1a. Basic Configuration

Figure 2:
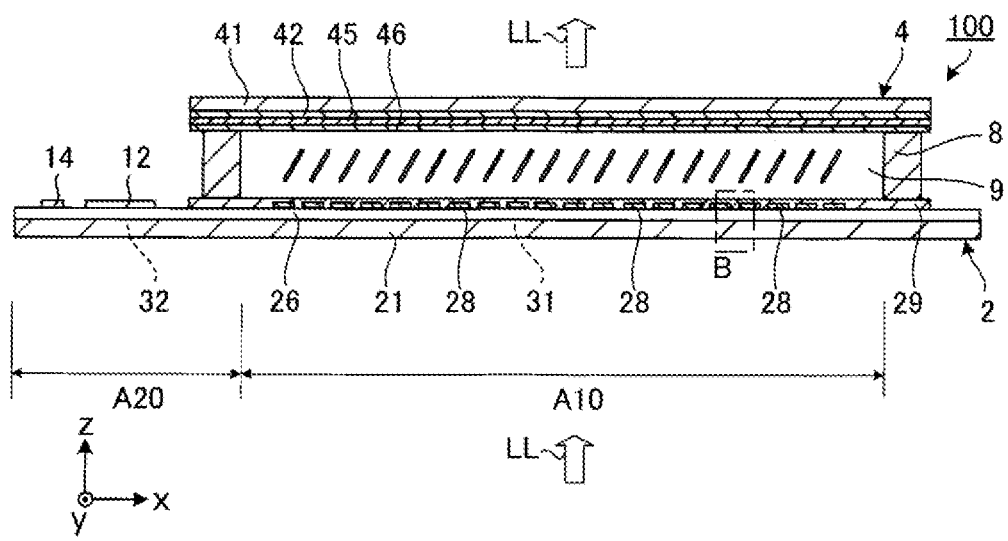
FIG. 2 is cross-sectional view of the electro-optical device according to the first exemplary embodiment.

FIG. 1 is a plan view of an electro-optical device 100 of a first exemplary embodiment. FIG. 2 is a cross-sectional view of the electro-optical device 100 of the first exemplary embodiment, and is a cross-sectional view along line A-A in FIG. 1. Note that, for convenience of explanation, the description will be made appropriately using an x-axis, a y-axis, and a z-axis orthogonal to each other and respectively illustrated in FIG. 1 and FIG. 2.

The electro-optical device 100 illustrated in FIG. 1 and FIG. 2 serves as a transmissive-type liquid crystal display device. As illustrated in FIG. 2, the electro-optical device 100 includes an element substrate 2 having translucency, a counter substrate 4 having translucency, a sealing member 8 having a frame shape, and a liquid crystal layer 9. The sealing member 8 is disposed between the element substrate 2 and the counter substrate 4. The liquid crystal layer 9 is disposed in a region surrounded by the element substrate 2, the counter substrate 4, and the sealing member 8. Here, an alignment direction of the element substrate 2, the liquid crystal layer 9, and the counter substrate 4 is in the z direction, and a surface of the element substrate 2 is parallel to the x-y plane. Further, "plan view from the thickness direction" or simply "plan view" is taken from the z direction parallel to a thickness direction of a first base member 21 described below of the element substrate 2.

In the present exemplary embodiment, a case in which light LL is incident on the electro-optical device 100 from the element substrate 2, passes through the liquid crystal layer 9, and is emitted from the counter substrate 4 will be described as an example. Note that, in the descriptions below, incident light being incident on the electro-optical device 100, light transmitting through the electro-optical device 100, and emission light being emitted from the electro-optical device 100 are all described as light LL without any distinction. Further, the light LL is visible light and, in the following descriptions, "translucency" or "transmissive" refers to transmissivity to visible light, and means that a transmittance of visible light is preferably greater than or equal to 50%. Further, as illustrated in FIG. 1, the electro-optical device 100 has a rectangular shape in plan view, but the shape of the electro-optical device 100 in plan view is not limited to this rectangular shape and may be, for example, a round shape or the like.

As illustrated in FIG. 1, the element substrate 2 has a size encompassing the counter substrate 4 in plan view. As illustrated in FIG. 2, the element substrate 2 includes the first base member 21 as a "base material", a wiring layer 26, a plurality of pixel electrodes 28, and a first alignment film 29. The first base member 21, the wiring layer 26, the plurality of pixel electrodes 28, and the first alignment film 29 are aligned in this order. The first alignment film 29 is positioned closest to the liquid crystal layer 9. Further, in the first base member 21, a plurality of first light-shielding bodies 31 and a plurality of second light-shielding bodies 32 are disposed. The first base member 21 is constituted by a flat plate having translucency and insulating properties. The first base member 21 is formed of glass or quartz, for example. The plurality of pixel electrodes 28 each have translucency and are formed of a transparent conductive material such as indium tin oxide (ITO) or indium zinc oxide (IZO), for example. The first alignment film 29 aligns the liquid crystal molecules of the liquid crystal layer 9. Examples of the constituent material of the first alignment film 29 include polyimide, silicon oxide, and the like. Note that the wiring layer 26, the first light-shielding body 31, and the second light-shielding body 32 will be described later.

As illustrated in FIG. 2, the counter substrate 4 includes a second base member 41, an insulating layer 42, a counter electrode 45, and a second alignment film 46. The second base member 41, the insulating layer 42, the counter electrode 45, and the second alignment film 46 are aligned in this order. The second alignment film 46 is positioned closest to the liquid crystal layer 9. The second base member 41 is constituted by a flat plate having translucency and insulating properties. The second base member 41 is formed of glass, quartz, or the like, for example. The insulating layer 42 is formed from a silicon based inorganic material having translucency and insulating properties such as silicon oxide, for example. The counter electrode 45 is formed of a transparent conductive material such as ITO or IZO, for example. The second alignment film 46 aligns the liquid crystal molecules of the liquid crystal layer 9. Examples of the constituent material of the second alignment film 46 include polyimide, silicon oxide, and the like.

The sealing member 8 is formed using an adhesive or the like containing various types of curable resins such as epoxy resin, for example. The sealing member 8 is affixed to each of the element substrate 2 and the counter substrate 4. As illustrated in FIG. 1, an injection port 81 for injecting a liquid crystal material containing liquid crystal molecules is formed in a portion of the sealing member 8. The injection port 81 is sealed with a sealing material 80 formed using various types of resin materials.

The liquid crystal layer 9 illustrated in FIG. 2 contains liquid crystal molecules having positive or negative dielectric anisotropy. The liquid crystal layer 9 is interposed between the element substrate 2 and the counter substrate 4 such that the liquid crystal molecules are in contact with both the first alignment film 29 and the second alignment film 46. The alignment of the liquid crystal molecules contained in the liquid crystal layer 9 varies in accordance with a voltage applied to the liquid crystal layer 9. A modulation of the light LL in accordance with the applied voltage allows the liquid crystal layer 9 to perform grayscale display.

Further, as illustrated in FIG. 1, a driving circuit 112 serving as a "circuit" is provided on the surface of the element substrate 2 that faces the counter substrate 4. The driving circuit 112 includes a plurality of scanning line driving circuits 11 and a signal line driving circuit 12. Further, a plurality of external terminals 14 are provided on the surface of the element substrate 2 that faces the counter substrate 4. The external terminal 14 is coupled with lead wirings 15 guided from each of the scanning line driving circuits 11 and the signal line driving circuit 12.

The electro-optical device 100 having such a configuration includes a display area A10 that displays images and the like, and a peripheral area A20 that surrounds the display area A10 in plan view. The display area A10 is provided with a plurality of pixels P arranged in a matrix pattern. The scanning line driving circuits 11, the signal line driving circuit 12, and the like are disposed in the peripheral area A20.

1-1b. Electrical Configuration

Figure 3:
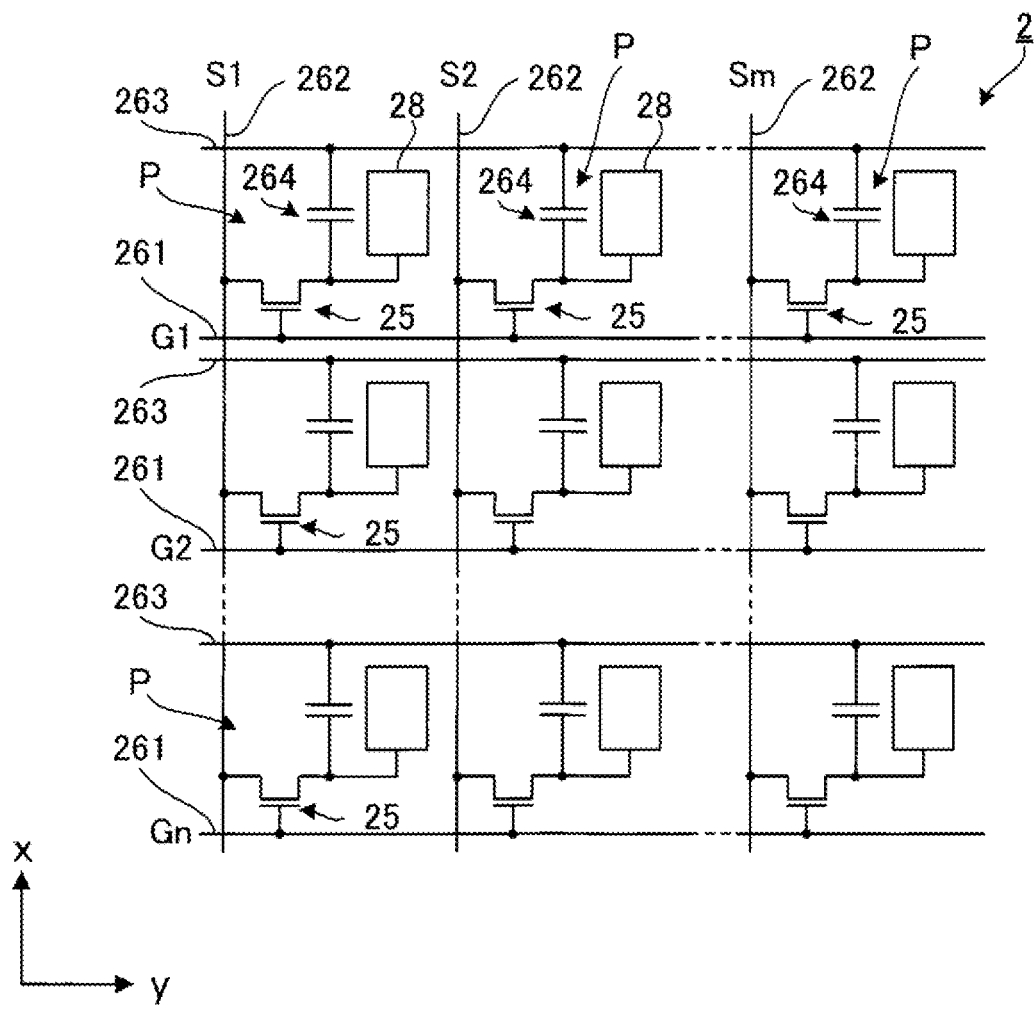
FIG. 3 is an equivalent circuit diagram illustrating an electrical configuration of an element substrate of the first exemplary embodiment.

FIG. 3 is an equivalent circuit diagram illustrating an electrical configuration of the element substrate 2 of the first exemplary embodiment. As illustrated in FIG. 3, n scanning lines 261, m signal lines 262, and n capacitance lines 263 are provided on the element substrate 2. Note that n and m are each an integer greater than or equal to 2. The TFT 25 serving as a "switching element" is provided correspondingly to each of the intersections between the n scanning lines 261 and the m signal lines 262.

The n scanning lines 261 each extend in the y direction and are arranged at equal intervals in the x direction. The scanning line 261 is electrically coupled to a gate of the TFT 25. Further, the n scanning lines 261 are electrically coupled to the scanning line driving circuits 11 illustrated in FIG. 1. Scanning signals G1, G2, . . . , Gn are line-sequentially supplied from the scanning line driving circuits 11 to the n scanning lines 261.

The m signal lines 262 illustrated in FIG. 3 each extend in the x direction and are arranged at equal intervals in the y direction. The scanning line 262 is electrically coupled to a source of the TFT 25. Further, the m signal lines 262 are electrically coupled to the signal line driving circuit 12 illustrated in FIG. 1. Image signals S1, S2, . . . , and Sm are supplied to the m signal lines 262 in parallel from the signal line driving circuit 12 illustrated in FIG. 1.

The n scanning lines 261 and the m signal lines 262 illustrated in FIG. 3 are insulated from each other and are formed in a lattice-like pattern in plan view. A region surrounded by two adjacent scanning lines 261 and two adjacent signal lines 262 corresponds to a pixel P. In one pixel P is formed one pixel electrode 28. The pixel electrode 28 is electrically coupled to the TFT 25.

The n capacitance lines 263 each extend in the y direction and are arranged at equal intervals in the x direction. Further, the n capacitance lines 263 are insulated from the plurality of signal lines 262 and the plurality of scanning lines 261, and are formed apart from these lines. A fixed potential such as a ground potential is applied to the capacitance lines 263. Further, a storage capacitor 264 is provided in parallel with a liquid crystal capacitor, between the capacitance line 263 and the pixel electrode 28, to prevent leakage of charges held in the liquid crystal capacitor.

The scanning signals G1, G2, . . . , Gn become sequentially active and n scanning lines 261 are sequentially selected, then the TFT 25 coupled to the selected scanning line 261 is turned ON. Then, the image signals S1, S2, . . . , Sm having magnitudes commensurate with the grayscale to be displayed are transmitted, via the m signal lines 262, to the pixel P corresponding to the selected scanning line 261, and are then applied to the pixel electrodes 28. This allows a voltage in accordance with the grayscale to be displayed to be applied to the liquid crystal capacitor formed between the pixel electrode 28 and the counter electrode 45 of the counter substrate 4 illustrated in FIG. 2, and the alignment of the liquid crystal molecules changes in accordance with the applied voltage. Further, the applied voltage is held by the storage capacitor 264. Such a variation in the alignment of the liquid crystal molecules causes the light LL to be modulated, and thus enable grayscale display.

1-1c. Wiring Layer 26 of Element Substrate 2

Figure 4:
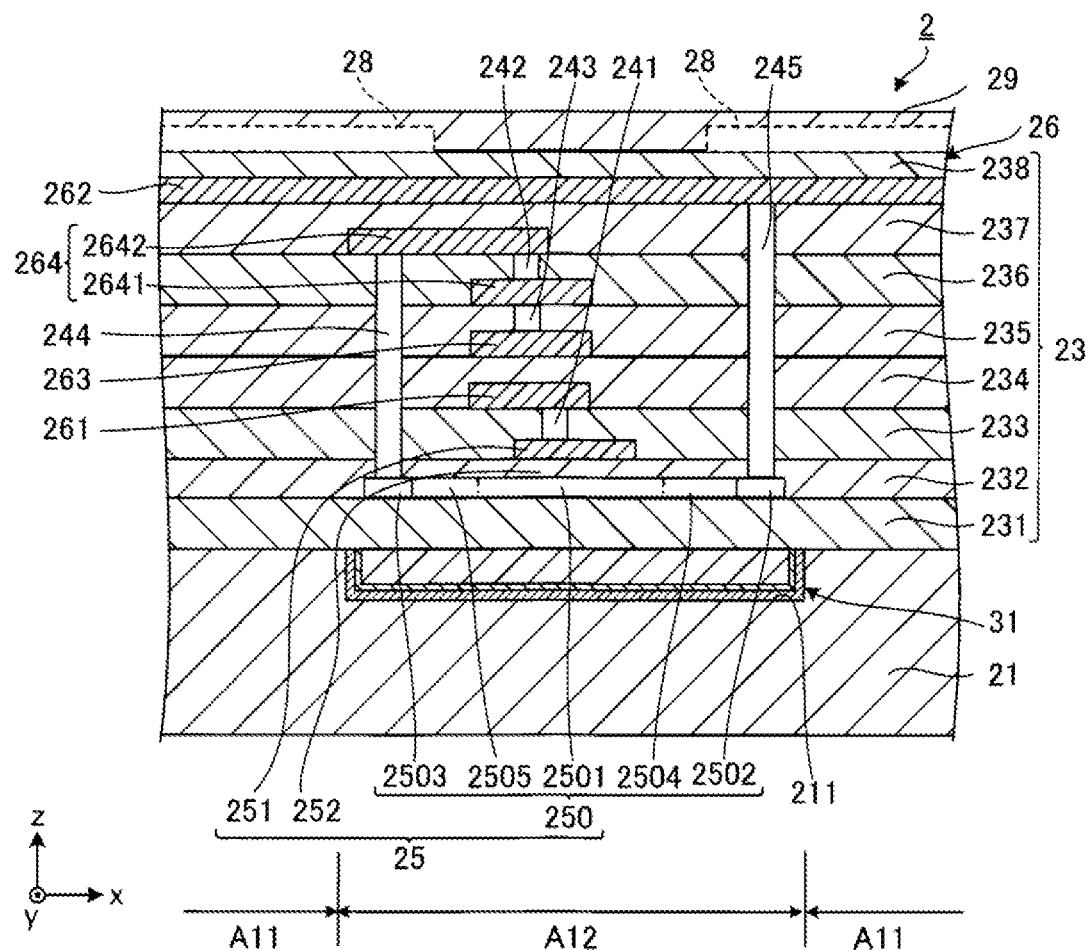
FIG. 4 is a partial cross-sectional view of the element substrate in the first exemplary embodiment.

FIG. 4 is a partial cross-sectional view of the element substrate 2 in the first exemplary embodiment. Note that FIG. 4 is an enlarged view of a region B in FIG. 2.

The wiring layer 26 includes a plurality of light transmission areas A11 through which the light LL passes, and a wiring area A12 where the TFT 25 and various wires are disposed. The wiring area A12 blocks the light LL. The wiring area A12 has a lattice shape in plan view. The wiring area A12 surrounds the light transmission area A11 in plan view. The plurality of the light transmission areas A11 are disposed in a matrix pattern in plan view. The light transmission area A11 has a substantially rectangular shape in plan view.

The wiring layer 26 includes the TFT 25, the scanning line 261, the capacitance line 263, the signal line 262, and the storage capacitor 264. Note that the order of the TFT 25, the scanning line 261, the capacitance line 263, the storage capacitor 264, and the signal line 262 illustrated in FIG. 4 is one example, and is not limited to the illustrated example. Further, the wiring layer 26 includes an insulator 23 having insulating properties and translucency. The insulator 23 includes a first interlayer insulating film 231, a second interlayer insulating film 232, a third interlayer insulating film 233, a fourth interlayer insulating film 234, a fifth interlayer insulating film 235, a sixth interlayer insulating film 236, a seventh interlayer insulating film 237, and an eighth interlayer insulating film 238.

The first interlayer insulating film 231 is disposed on the first base member 21. The TFT 25 is disposed on the first interlayer insulating film 231. The TFT 25 includes a semiconductor layer 250, a gate electrode 251, and a gate insulating film 252. The semiconductor layer 250 is disposed on the first interlayer insulating film 231 in contact with the first interlayer insulating film 231. The gate insulating film 252 is interposed between the semiconductor layer 250 and the gate electrode 251.

The semiconductor layer 250 includes a channel area 2501, a source area 2502, a drain area 2503, a first LDD area 2504, and a second LDD area 2505. The channel area 2501 is positioned between the source area 2502 and the drain area 2503. The channel area 2501 overlaps the gate electrode 251 in plan view. The first LDD area 2504 is positioned between the channel area 2501 and the source area 2502. The second LDD area 2505 is positioned between the channel area 2501 and the drain area 2503. Note that at least one of the first LDD area 2504 and the second LDD area 2505, and particularly the first LDD area 2504, may be omitted. Further, the semiconductor layer 250 is formed by, for example, depositing polysilicon. Impurities that enhance conductivity are doped in a region of the semiconductor layer 250 excluding the channel area 2501. An impurity concentration in the first LDD area 2504 and the second LDD area 2505 is lower than an impurity concentration in the source area 2502 and the drain area 2503.

The second interlayer insulating film 232 is disposed on the semiconductor layer 250. The third interlayer insulating film 233 is disposed on the second interlayer insulating film 232 so as to cover the gate electrode 251. The scanning line 261 is disposed on the third interlayer insulating film 233. Further, a contact 241 electrically coupling the scanning line 261 and the gate electrode 251 is disposed in the third interlayer insulating film 233. The fourth interlayer insulating film 234 is disposed on the scanning line 261. The capacitance line 263 is disposed on the fourth interlayer insulating film 234. The fifth interlayer insulating film 235 is disposed on the capacitance line 263.

The storage capacitor 264 includes a first capacitor 2641 and a second capacitor 2642. The first capacitor 2641 is disposed on the fifth interlayer insulating film 235. The sixth interlayer insulating film 236 is disposed on the first capacitor 2641. The second capacitor 2642 is disposed on the sixth interlayer insulating film 236. Further, a contact 242 electrically coupling the first capacitor 2641 and the second capacitor 2642 is disposed in the sixth interlayer insulating film 236. The first capacitor 2641 and the second capacitor 2642, although not illustrated in detail, are each constituted by two capacitance electrodes and a dielectric body disposed between these capacitance electrodes.

A contact 243 for electrically coupling the first capacitor 2641 and the capacitance line 263 is disposed in the fifth interlayer insulating film 235. A contact 244 electrically coupling the second capacitor 2642 and the drain area 2503 is disposed in the second to sixth interlayer insulating films 232 to 236. Further, the drain area 2503 is electrically coupled, via the contact 244, the storage capacitor 264, and a contact or the like not illustrated, to the pixel electrode 28.

The seventh interlayer insulating film 237 is disposed on the second capacitor 2642. The signal line 262 is disposed on the seventh interlayer insulating film 237. Further, although not illustrated in detail, an intersection where the signal line 262 and the scanning line 261 intersect in plan view overlaps the TFT 25. A contact 245 electrically coupling the signal line 262 and the source area 2502 is disposed in the second to seventh interlayer insulating films 232 to 237. The eighth interlayer insulating film 238 is disposed on the seventh interlayer insulating film 237 so as to cover the signal line 262. The pixel electrode 28 is disposed on the eighth interlayer insulating film 238. One pixel electrode 28 and one light transmission area A11 overlap in plan view.

The first to eighth interlayer insulating films 231 to 238 are formed using, for example, a silicon-based inorganic compound. Specifically, the first to eighth interlayer insulating films 231 to 238 are, for example, constituted by a silicon thermal oxide film or a silicon oxide film formed by a vapor deposition method such as a chemical vapor deposition (CVD) method. Further, examples of the constituent materials of the gate electrode 251, the scanning line 261, the signal line 262, the capacitance line 263, and the capacitance electrode of the storage capacitor 264 include materials that are conductive, such as a polysilicon, a metal, a metal silicide, and a metal compound. Further, each of the constituent materials of the contacts 241 to 245 described above is also formed using a material that is conductive.

1-1d. First Light-Shielding Body 31 and Second Light-Shielding Body 32 of Element Substrate 2

Figure 5:
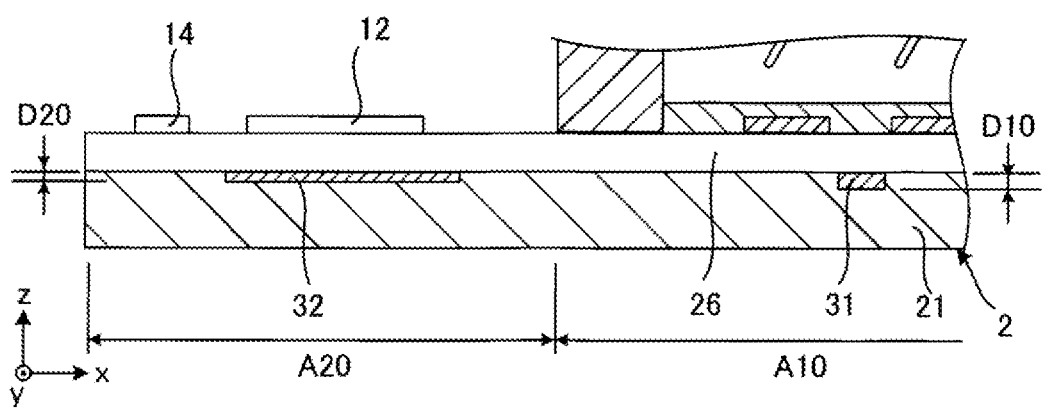
FIG. 5 is a cross-sectional view illustrating an arrangement of a first light-shielding body and a second light-shielding body in the first exemplary embodiment.

FIG. 5 is a cross-sectional view illustrating an arrangement of the first light-shielding body 31 and the second light-shielding body 32 in the first exemplary embodiment. As illustrated in FIG. 5, the first light-shielding body 31 and the second light-shielding body 32 are provided to the first base member 21. The first light-shielding body 31 is disposed in the display area A10. On the other hand, the second light-shielding body 32 is disposed in the peripheral area A20. The first light-shielding body 31 and the second light-shielding body 32 each have a light shielding property. "Light shielding property" refers to a light shielding property with respect to visible light, and specifically means that a transmittance of visible light is less than or equal to 10%, and preferably less than or equal to 5%. Further, the first light-shielding body 31 and the second light-shielding body 32 are each conductive. Note that, in the present exemplary embodiment, the first light-shielding body 31 and the second light-shielding body 32 are insulated from various wires. Further, the first light-shielding body 31 and the second light-shielding body 32 are insulated from each other.

Figure 6:
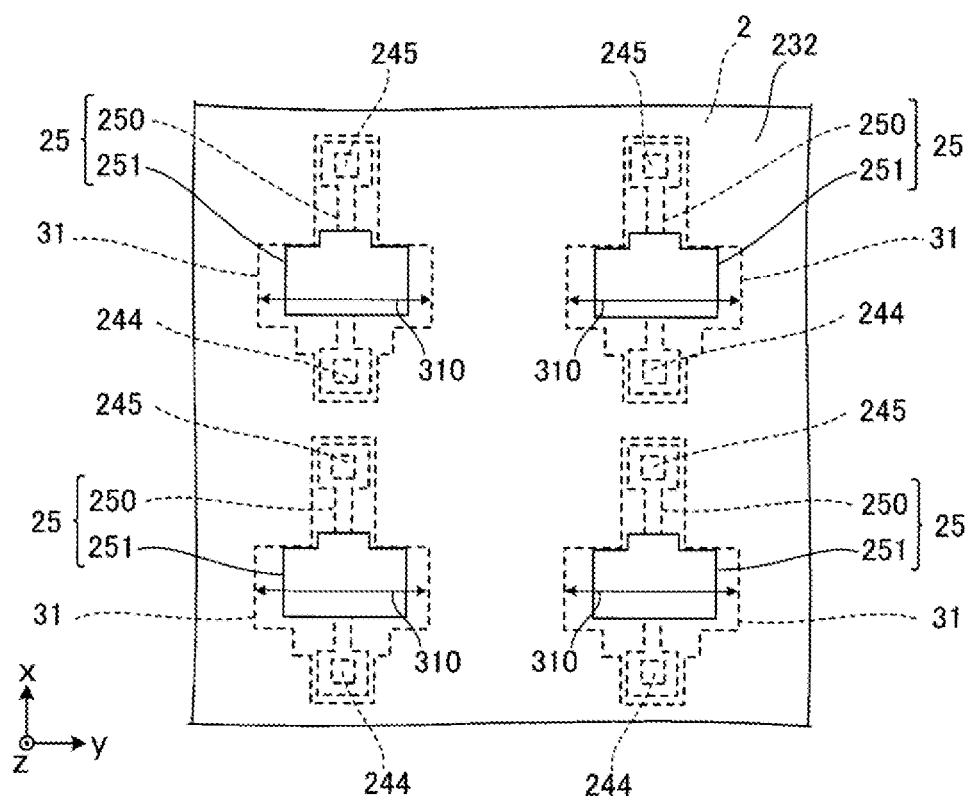
FIG. 6 is a plan view illustrating an arrangement of the first light-shielding body in the first exemplary embodiment.

FIG. 6 is a plan view illustrating an arrangement of the first light-shielding body 31 in the first exemplary embodiment. As illustrated in FIG. 6, the first light-shielding body 31 overlaps the TFT 25 in plan view. One first light-shielding body 31 is disposed relative to one TFT 25. Accordingly, in the first base member 21, a plurality of first light-shielding bodies 31 are disposed. Further, because the TFT 25 is disposed in a matrix pattern in the x direction and the y direction in plan view, the plurality of first light-shielding bodies 31 are disposed in a matrix pattern in the x direction and the y direction in plan view. Further, in the illustration, the first light-shielding body 31 has a longitudinal shape extending in the y direction in plan view. The first light-shielding body 31 includes, midway in a longitudinal direction thereof, a wide portion 310 that is wider than both ends in the longitudinal direction of the first light-shielding body 31. The wide portion 310 overlaps the gate electrode 251 of the TFT 25 in plan view. Note that, in the present exemplary embodiment, the gate electrode 251 and the first light-shielding body 31 described above are insulated, but may be electrically coupled. In this case, the first light-shielding body 31 can be used as a back gate.

Figure 7:
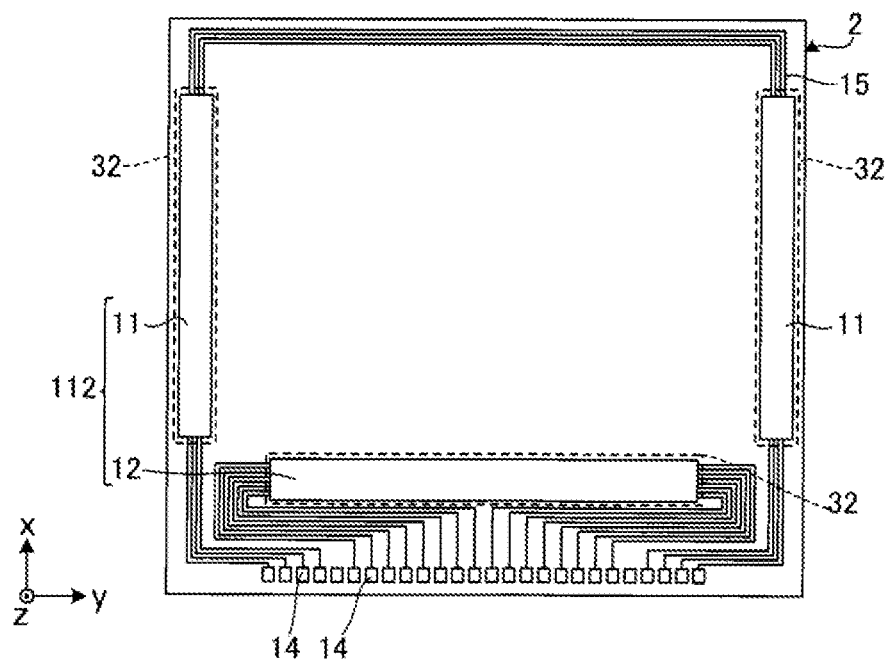
FIG. 7 is a plan view illustrating an arrangement of the second light-shielding body in the first exemplary embodiment.

FIG. 7 is a plan view illustrating an arrangement of the second light-shielding body 32 in the first exemplary embodiment. As illustrated in FIG. 7, the second light-shielding body 32 overlaps the driving circuit 112 in plan view. Specifically, one second light-shielding body 32 is disposed relative to one scanning line driving circuit 11. Further, one second light-shielding body 32 is disposed relative to one signal line driving circuit 12. Accordingly, in the first base member 21, a plurality of the second light-shielding bodies 32 are disposed. Note that the second light-shielding body 32 may be disposed overlapping the external terminal 14 and the lead wiring 15 in plan view.

Figure 8:
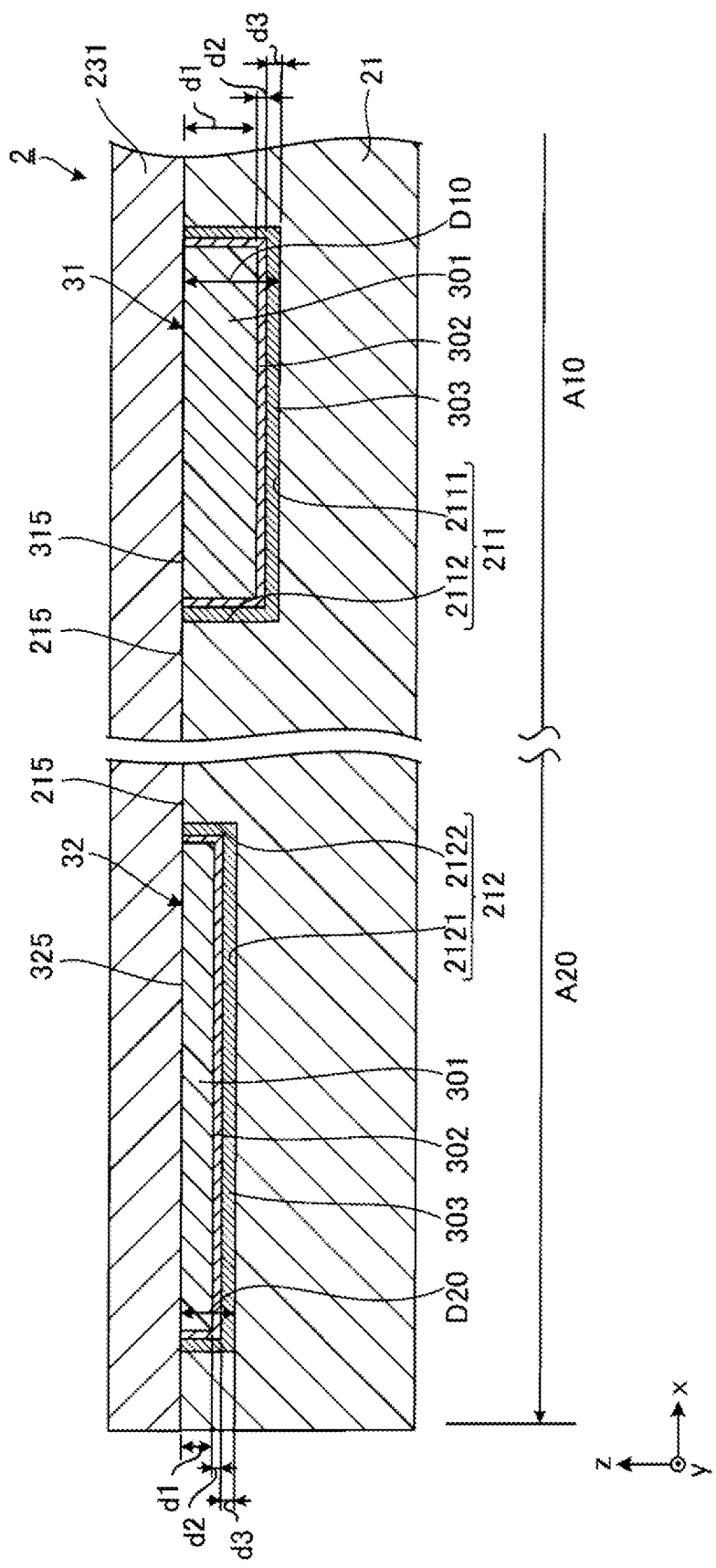
FIG. 8 is a cross-sectional view illustrating the first light-shielding body and the second light-shielding body in the first exemplary embodiment.

FIG. 8 is a cross-sectional view illustrating the first light-shielding body 31 and the second light-shielding body 32 in the first exemplary embodiment. As illustrated in FIG. 8, a first recessed portion 211 disposed in the display area A10 and a second recessed portion 212 disposed in the peripheral area A20 are provided in the first base member 21. The first recessed portion 211 and the second recessed portion 212 are each a depression formed in the surface of the first base member 21 on the +z side. In the first recessed portion 211, the first light-shielding body 31 is disposed. In the second recessed portion 212, the second light-shielding body 32 is disposed. Note that the first recessed portion 211 is formed for every first light-shielding body 31. Note that the second recessed portion 212 is formed for every second light-shielding body 32.

An inner wall surface of the first base member 21 forming the first recessed portion 211 has a bottom surface 2111 and a side surface 2112. The bottom surface 2111 is a surface on the −z axis side that forms the first recessed portion 211. In the present exemplary embodiment, the bottom surface 2111 is a continuous flat surface without steps, extending along the x-y plane. The side surface 2112 connects the bottom surface 2111 and the upper surface 215. An upper surface 215 is a surface positioned on the +z side of an outer peripheral surface of the first base member 21 and is in contact with the first interlayer insulating film 231. Further, in the present exemplary embodiment, the side surface 2112 is a surface extending along the z axis parallel to the thickness direction of the first base member 21. Further, the angle formed by the bottom surface 2111 and the side surface 2112 is substantially 90°.

Similarly, an inner wall surface of the first base member 21 forming the second recessed portion 212 has a bottom surface 2121 and a side surface 2122. The bottom surface 2121 is a surface on the −z axis side that forms the second recessed portion 212. In the present exemplary embodiment, the bottom surface 2121 is a continuous flat surface without steps, extending along the x-y plane. The side surface 2122 connects the bottom surface 2121 and the upper surface 215. The upper surface 215 is a surface positioned on the +z side of the outer peripheral surface of the first base member 21 and is in contact with the first interlayer insulating film 231. Further, in the present exemplary embodiment, the side surface 2122 is a surface extending along the z axis parallel to the thickness direction of the first base member 21. Further, the angle formed by the bottom surface 2121 and the side surface 2122 is substantially 90°.

A depth of the first recessed portion 211 formed in the first base member 21 is deeper than a depth of the second recessed portion 212. Accordingly, a first thickness D10 of the first light-shielding body 31 is greater than a second thickness D20 of the second light-shielding body 32. The first thickness D10 and the second thickness D20 are each lengths in the z-axis direction. Further, the first thickness D10 of the first light-shielding body 31 is constant. Similarly, the second thickness D20 of the second light-shielding body 32 is constant.

The first light-shielding body 31 and the second light-shielding body 32 each include a first metal film 301, a second metal film 302, and a third metal film 303. The third metal film 303 is disposed on the first base member 21. The second metal film 302 is disposed on the third metal film 303. The first metal film 301 is disposed on the second metal film 302. That is, the third metal film 303, the second metal film 302, and the first metal film 301 are stacked in this order from the first base member 21. Note that, because the films included in the first light-shielding body 31 and the second light-shielding body 32 are the same, the first light-shielding body 31 will be described as a representative for the first metal film 301, the second metal film 302, and the third metal film 303 below.

The third metal film 303 is configured to contain, for example, tungsten silicide. The second metal film 302 is configured to contain, for example, tungsten nitride (WN) or titanium nitride (TiN). The first metal film 301 is configured to contain, for example, tungsten. Among the various metals, tungsten has excellent heat resistance as well as an optical density (OD) value that does not readily decline by heat treatment during manufacturing, for example. Thus, with the first metal film containing tungsten, the light shielding property of the first light-shielding body 31 can be enhanced.

Further, with the first light-shielding body 31 including the second metal film 302 and the third metal film 303, an adhesion between the first base member 21 and the first light-shielding body 31 can be enhanced compared to when the second metal film 302 and the third metal film 303 are not included. In particular, because the third metal film 303 contains silicon atoms, the third metal film 303 has excellent adhesion to the first base member 21 constituted by a silicon-based inorganic compound.

Further, tungsten silicide, compared to tungsten, has an OD value that readily decreases by heat treatment. Therefore, when the third metal film 303 and the first metal film 301 are in direct contact, the OD value of the first metal film 301 may decrease due to the effect of the tungsten silicide contained in the third metal film 303. In the first light-shielding body 31, the second metal film 302 is disposed between the third metal film 303 and the first metal film 301, and thus a decrease in the OD value of the first metal film 301 can be suppressed due to the effect of the tungsten silicide. That is, the second metal film 302 functions as a barrier layer that prevents the tungsten silicide contained in the third metal film 303 from diffusing into the first metal film 301.

Note that the second metal film 302 may be configured to contain both tungsten nitride and titanium nitride, or may have a stacked structure of a metal nitride film containing tungsten nitride and a metal nitride film containing titanium nitride. Further, the first metal film 301, the second metal film 302, and the third metal film 303 may each be formed from a material other than the metal described above. The first metal film 301, the second metal film 302, and the third metal film 303 may each be configured to contain a metal other than the metal described above or a resin material, as long as the film at least has a light shielding property.

Further, a thickness d3 of the third metal film 303 is greater than a thickness d2 of the second metal film 302, and is thinner than a thickness d1 of the first metal film 301. With the thickness d1 being thickest, the light shielding property of the first light-shielding body 31 can be enhanced. Further, because the third metal film 303 has particularly excellent adhesion to the first base member 21, the thickness d3 being greater than the thickness d2 makes it possible to enhance the adhesion of the first light-shielding body 31 to the first base member 21, compared to when the thickness d3 is thinner than the thickness d2. Note that the size relationship of the thicknesses d1, d2, d3 is not limited to the relationship described above.

The thickness d1 is preferably 10 nm to 500 nm, inclusive. The thickness d2 is preferably 0.1 nm to 50 nm, inclusive. The thickness d3 is preferably 1 nm to 100 nm, inclusive. With the aforementioned ranges of the thicknesses d1, d2, d3 satisfied, the effects of enhancing the adhesion of the first light-shielding body 31 and enhancing the light shielding property of the first light-shielding body 31 can be particularly prominently exhibited while suppressing the first thickness D10 of the first light-shielding body 31.

Further, the thickness d1 of the first metal film 301 differs in the first light-shielding body 31 and the second light-shielding body 32. Note that the thickness d2 of the second metal film 302 and the thickness d3 of the third metal film 303 are substantially equal to each other in the first light-shielding body 31 and the second light-shielding body 32.

As described above, the electro-optical device 100 includes the first base member 21 as a "base material" having translucency, the pixel electrode 28 having translucency, the TFT 25 as a "switching element" electrically coupled to the pixel electrode 28, and the driving circuit 112 as a "circuit" configured to drive the TFT 25. Furthermore, the electro-optical device 100 includes the first light-shielding body 31 that comes into contact with the first base member 21 and overlaps the TFT 25 in plan view from the thickness direction of the first base member 21, and the second light-shielding body 32 that comes into contact with the first base member 21 and overlaps the driving circuit 112 in plan view. Then, the first thickness D10, which is the thickness of the first light-shielding body 31, and the second thickness D20, which is the thickness of the second light-shielding body 32, are different from each other. Note that the first base member 21 and the first light-shielding body 31 may be configured to be disposed with an insulating film or the like interposed therebetween.

With the first light-shielding body 31 overlapping the TFT 25 in plan view, the light LL can be blocked by the first light-shielding body 31, making it possible to prevent or reduce the incidence of the light LL on the TFT 25. Therefore, it is possible to suppress or prevent the occurrence of malfunction caused by leakage current of the TFT 25. Furthermore, with the second light-shielding body 32 overlapping the driving circuit 112 in plan view, the light LL can be blocked by the second light-shielding body 32, making it possible to prevent or reduce the incidence of the light LL on the driving circuit 112. Therefore, the occurrence of malfunction caused by leakage current that occurs due to the light LL incident on the driving circuit 112 can be suppressed or prevented. Then, with one of the first thickness D10 and the second thickness D20 made thicker than the other, an increase in the stress generated in the first base member 21 can be suppressed compared to when both are thickened. Thus, according to the electro-optical apparatus 100, an increase in the warping of the first base member 21 can be suppressed. Further, the occurrence of cracks and the like in the first light-shielding body 31 and the second light-shielding body 32 can be suppressed.

In particular, as described above, the first thickness D10 of the first light-shielding body 31 is greater than the second thickness D20 of the second light-shielding body 32. Therefore, compared to when the first thickness D10 is thinner than the second thickness D20, the light shielding property with respect to the TFT 25 can be enhanced. In the display area A10, compared to the peripheral area A20, a great amount of the light LL is transmitted therethrough. Therefore, by making the first thickness D10 thicker than the second thickness D20, it is possible to enhance the light shielding property with respect to the TFT 25 while suppressing an increase in the warping of the first base member 21. In this way, the thickness is adjusted in accordance with the location where the light shielding property is to be enhanced, making it possible to suppress an increase in the warping of the first base member 21 while enhancing the light shielding property with respect to the location.

Further, as described above, the first base member 21 is provided with the first recessed portion 211 overlapping the TFT 25 in plan view, and the second recessed portion 212 overlapping the driving circuit 112 in plan view. Then, the first light-shielding body 31 is disposed in an interior of the first recessed portion 211, and the second light-shielding body 32 is disposed in an interior the second recessed portion 212. With the first light-shielding body 31 disposed inside the first recessed portion 211, cracks and the like that occur in the first light-shielding body 31 during film formation can be reduced compared to when the first light-shielding body 31 is not disposed inside the first recessed portion 211. Similarly, with the second light-shielding body 32 disposed inside the second recessed portion 212, cracks and the like that occur in the second light-shielding body 32 during film formation can be reduced compared to when the second light-shielding body 32 is not disposed inside the second recessed portion 212.

In particular, the first light-shielding body 31 preferably does not protrude from the first recessed portion 211. That is, an upper surface 315 of the first light-shielding body 31 and the upper surface 215 of the first base member 21 are preferably continuously formed as a flat surface without steps. With the flat surface formed, cracks and the like in the first light-shielding body 31 can be particularly reduced. Similarly, the second light-shielding body 32 preferably does not protrude from the second recessed portion 212. That is, an upper surface 325 of the second light-shielding body 32 and the upper surface 215 of the first base member 21 are preferably continuously formed as a flat surface without steps.

Further, as described above, the bottom surface 2111 of the first recessed portion 211 is flat. That is, the bottom surface 2111 is a continuous surface without steps. With the bottom surface 2111 being flat, the first thickness D10 of the first light-shielding body 31 is readily made constant. With the first thickness D10 being constant, it is possible to suppress variations in a light-shielding performance of the first light-shielding body 31. Further, because the bottom surface 2111 is without steps, it is possible to suppress a diffuse reflection of the light LL at steps. Therefore, the possibility of the light LL being incident on the TFT 25 can also be reduced.

Similarly, the bottom surface 2121 of the second recessed portion 212 is flat. That is, the bottom surface 2121 is a continuous surface without steps, extending along the x-y plane. When the bottom surface 2121 is flat, the second thickness D20 of the second light-shielding body 32 is readily made constant. With the second thickness D20 being constant, it is possible to suppress variations in a light-shielding performance of the second light-shielding body 32. Further, because the bottom surface 2121 is without steps, it is possible to suppress the diffuse reflection of the light LL at steps.

Further, the first light-shielding body 31 encompasses the TFT 25 in plan view. Therefore, the incidence of the light LL on the TFT 25 can be suitably blocked compared to when the first light-shielding body 31 overlaps a portion of the TFT 25. However, the first light-shielding body 31 preferably at least overlaps the channel region 2501, the first LDD area 2504, and the second LDD area 2505 in plan view. When the light LL is incident on the channel area 2501, the first LDD area 2504, and the second LDD area 2505, malfunction caused by leakage current of the TFT 25 is particularly likely to occur. Therefore, because the first light-shielding body 31 overlaps the channel area 2501, the first LDD area 2504, and the second LDD area 2505 in plan view, malfunction caused by the leakage current of the TFT 25 can be particularly effectively prevented. Further, the second light-shielding body 32 encompasses the driving circuit 112 in plan view.

Thus, the incidence of the light LL on the driving circuit 112 can be suitably blocked compared to when the second light-shielding body 32 overlaps a portion of the driving circuit 112.

Note that the TFT 25 and the first light-shielding body 31 may at least partially overlap each other. Similarly, the driving circuit 112 and the second light-shielding body 32 may at least partially overlap each other.

1-1e. Method for Manufacturing Electro-Optical Device 100

Figure 9:
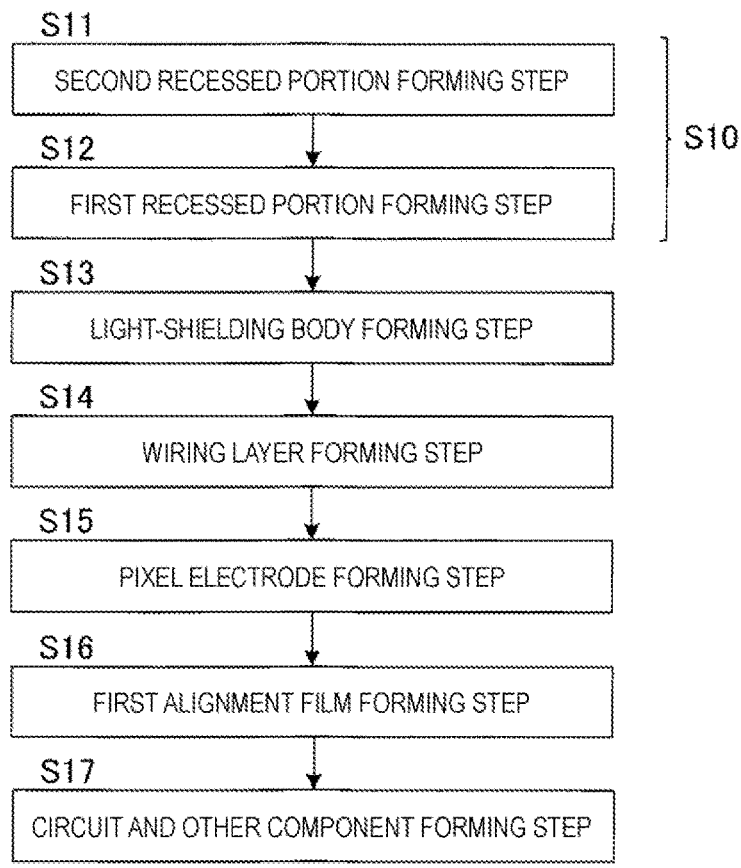
FIG. 9 is a flowchart illustrating a method for manufacturing an element substrate according to the first exemplary embodiment.

Next, a method for manufacturing the electro-optical device 100 will be described. First, a method for manufacturing the element substrate 2 of the electro-optical device 100 will be described. FIG. 9 is a flowchart illustrating a method for manufacturing the element substrate 2 of the first exemplary embodiment.

As illustrated in FIG. 9, the method for manufacturing the element substrate 2 includes a first base member preparing step S10, a light-shielding body forming step S13, a wiring layer forming step S14, a pixel electrode forming step S15, a first alignment film forming step S16, and a circuit and other component forming step S17. The element substrate 2 is manufactured by sequentially performing each of these steps. Further, the first base member preparing step S10 includes a second recessed portion forming step S11 and a first recessed portion forming step S12. Note that the circuit and other component forming step S17 may be performed in parallel with the wiring layer forming step S14. Further, the circuit and other component forming step S17 may be performed after the wiring layer forming step S14 and before the pixel electrode forming step S15. Further, the circuit and other component forming step S17 may be performed after the pixel electrode forming step S15 and before the first alignment film forming step S16.

Figure 10:
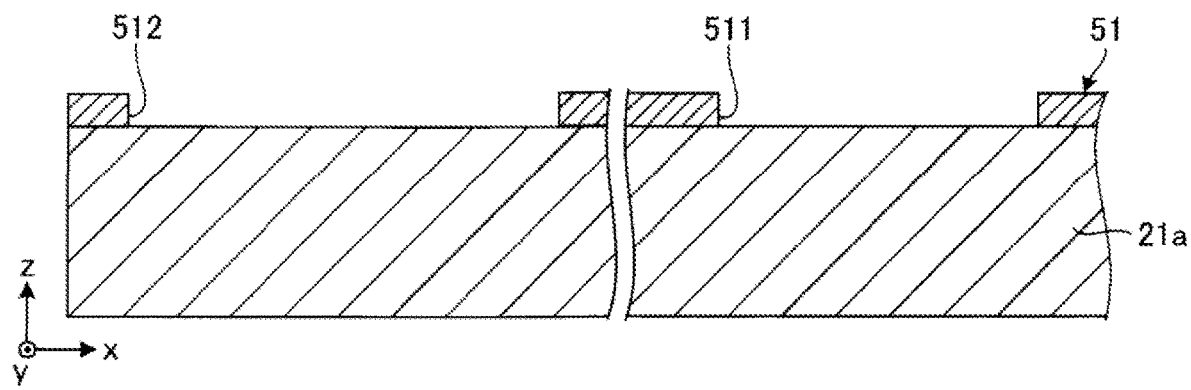
FIG. 10 is a cross-sectional view for explaining a second recessed portion forming step of the first exemplary embodiment.
Figure 11:
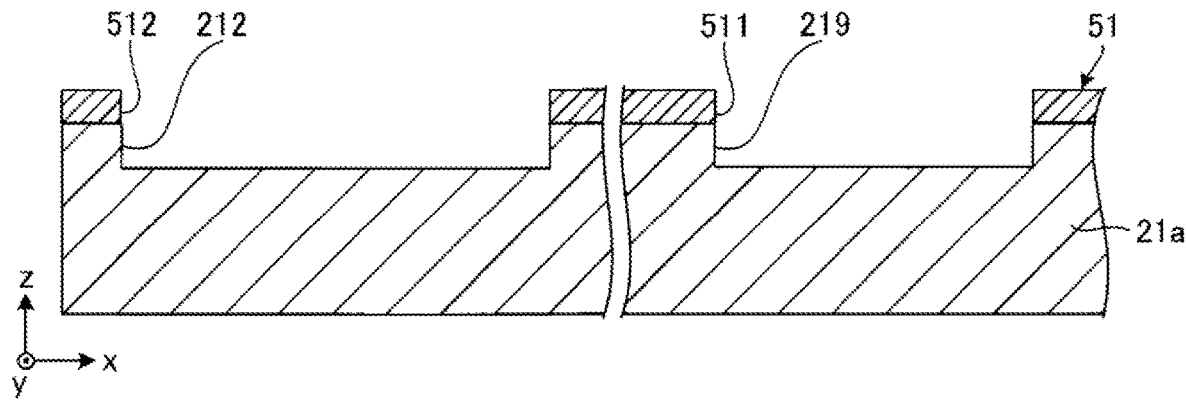
FIG. 11 is a cross-sectional view for explaining the second recessed portion forming step of the first exemplary embodiment.

FIG. 10 and FIG. 11 are cross-sectional views for explaining the second recessed portion forming step S11 of the first exemplary embodiment. In the second recessed portion forming step S11, first a hard mask 51 is formed on a mother substrate 21a configured by, for example, a quartz substrate or the like, as illustrated in FIG. 10. The hard mask 51 includes, in plan view, an opening 511 corresponding to the first recessed portion 211 and an opening 512 corresponding to the second recessed portion 212. Further, examples of the constituent material of the hard mask 51 include a metal such as silicon, tungsten, and the like, and a metal silicide such as tungsten silicide. Among these, the hard mask 51 preferably contains silicon. With the hard mask 51 containing silicon, anisotropically etching, for example, can be used to form the hard mask 51 with high dimensional accuracy.

Next, in the second recessed portion forming step S11, the second recessed portion 212 and a recessed portion 219 are formed in the mother substrate 21a by etching using the hard mask 51, as illustrated in FIG. 10. For example, when the first base member 21 is a quartz substrate or a glass substrate, it is preferable to use an etching gas in which oxygen or carbon monoxide is mixed in a halogen-based gas such as chlorine or fluorine.

Figure 12:
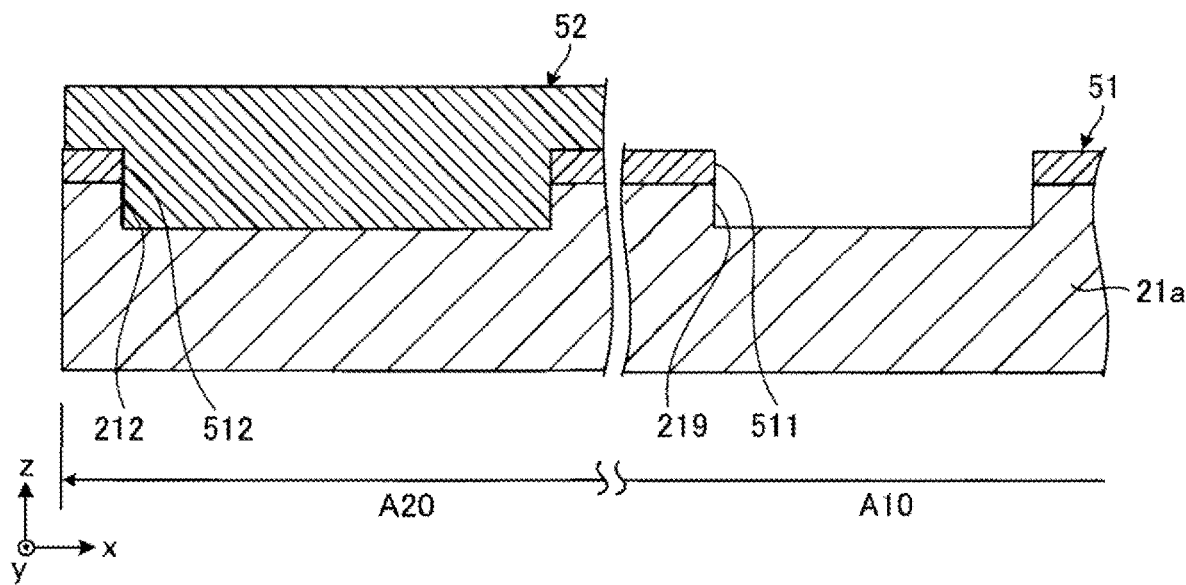
FIG. 12 is a cross-sectional view for explaining a first recessed portion forming step of the first exemplary embodiment.
Figure 13:
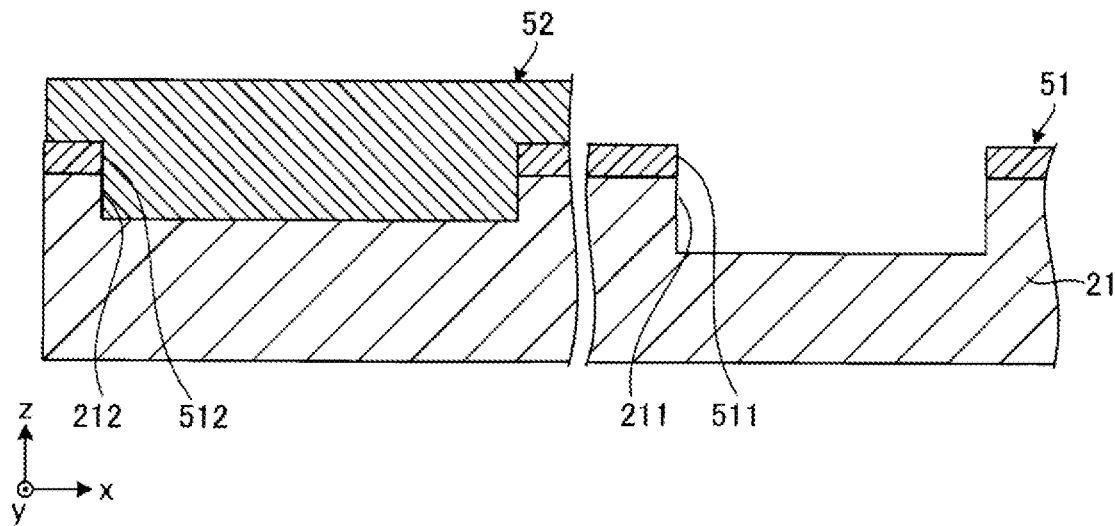
FIG. 13 is a cross-sectional view for explaining the first recessed portion forming step of the first exemplary embodiment.
Figure 14:
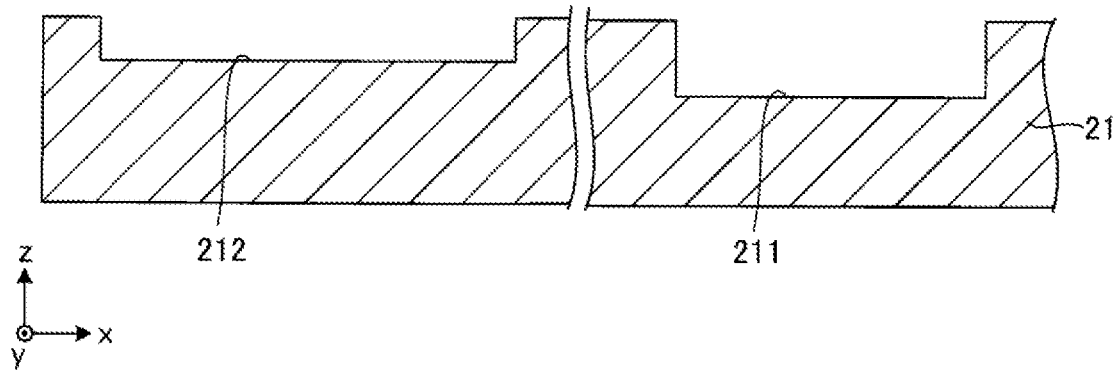
FIG. 14 is a cross-sectional view for explaining the first recessed portion forming step of the first exemplary embodiment.

FIG. 12, FIG. 13, and FIG. 14 are each a cross-sectional view for explaining the first recessed portion forming step S12 of the first exemplary embodiment. In the first recessed portion forming step S12, first, as illustrated in FIG. 12, a resist mask 52 is formed on the hard mask 51. The resist mask 52 is formed to fill the second recessed portion 212 and the opening 512 of the hard mask 51. Further, the resist mask 52 is formed so as not to overlap the recessed portion 219 in plan view.

Next, in the first recessed portion forming step S12, the first recessed portion 211 is formed in the mother substrate 21a by etching using the hard mask 51 and the resist mask 52, as illustrated in FIG. 13. For example, when the first base member 21 is a quartz substrate or a glass substrate, it is preferable to use an etching gas in which oxygen or carbon monoxide is mixed in a halogen-based gas such as chlorine or fluorine. Subsequently, as illustrated in FIG. 14, the hard mask 51 and the resist mask 52 are removed. In this way, the first base member 21 including the first recessed portion 211 and the second recessed portion 212 is obtained.

The hard mask 51 including the opening 511 and the opening 512, and the resist mask 52 that fills the opening 512 are used to perform etching, making it possible to deepen the depth of the recessed portion 219 while maintaining the shape of the second recessed portion 212. Thus, the first recessed portion 211 having a depth deeper than the depth of the second recessed portion 212 can be easily formed. Further, in the formation of the first recessed portion 211, the hard mask 51 is used as is without being peeled. Therefore, when the depth of the recessed portion 219 is deepened to form the first recessed portion 211, displacement in the x-y plane can be prevented.

Figure 15:
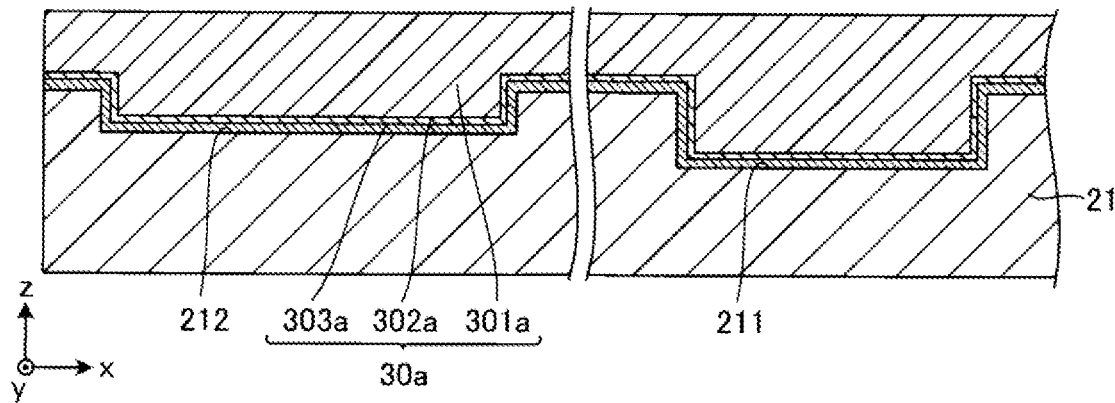
FIG. 15 is a cross-sectional view for explaining a light-shielding body forming step of the first exemplary embodiment.

FIG. 15 is a cross-sectional view for explaining the light-shielding body forming step S13 of the first exemplary embodiment. Next, in the light-shielding body forming step S13, a light-shielding layer 30a illustrated in FIG. 15 is formed. Specifically, first, a third light-shielding layer 303a is formed by depositing a composition containing, for example, tungsten silicide within the first recessed portion 211 and the second recessed portion 212 by a vapor deposition method such as, for example, a chemical vapor deposition (CVD) method. Subsequently, using a similar method, a second light-shielding layer 302a is formed by depositing a composition containing, for example, tungsten nitride or titanium nitride on the third light-shielding layer 303a. Subsequently, using a similar method, the first light-shielding layer 301a is formed by depositing a composition containing, for example, tungsten on the second light-shielding layer 302a. With the third light-shielding layer 303a, the second light-shielding layer 302a, and the first light-shielding layer 301a formed, the light-shielding layer 30a illustrated in FIG. 15 is formed.

Next, the first light-shielding body 31 and the second light-shielding body 32 illustrated in FIG. 8 are formed by subjecting the light-shielding layer 30a to a flattening treatment by performing polishing, such as chemical mechanical polishing (CMP). With the implementation of polishing such as CMP, a flat surface constituted by the upper surface 315 of the first light-shielding body 31 and the upper surface 215 of the first base member 21 can be easily formed. The same applies to the upper surface 325 of the second light-shielding body 32.

Next, in the wiring layer forming step S14, while not illustrated, various wirings such as the TFT 25, the scanning line 261, the capacitance line 263, the signal line 262, and the storage capacitor 264, and the insulator 23 are formed. Specifically, the various wirings are respectively formed by forming a metal film by, for example, a sputtering method or a vapor deposition method, and then carrying out etching on the metal film. Each of the layers included in the insulator 23 is formed using a vapor deposition method such as a CVD method and a flattening treatment by polishing, such as CMP.

Next, in the pixel electrode forming step S15, although not illustrated, the plurality of pixel electrodes 28 are formed on the wiring layer 26 in the display area A10. Specifically, the pixel electrode 28 is formed by forming a layer formed of, for example, a transparent electrode material by a vapor deposition method such as a CVD method, and then patterning the layer using a mask.

Next, in the first alignment film forming step S16, the first alignment film 29 is formed by forming a layer formed of, for example, polyimide using a vapor deposition method such as a CVD method, and then performing a rubbing treatment on the layer.

Next, in the circuit and other component forming step S17, although not illustrated, the scanning line driving circuit 11 and the signal line driving circuit 12 are formed on the wiring layer 26 in the peripheral area A20. At this time, the lead wiring 15, the external terminal 14, and the like are also formed. Thus, as described above, the element substrate 2 illustrated in FIG. 2 is formed.

Note that, for example, the counter substrate 4 is formed using known techniques as appropriate, and the element substrate 2 and the counter substrate 4 are, via the sealing member 8, bonded together. Subsequently, a liquid crystal material is injected between the element substrate 2, the counter substrate 4, and the sealing member 8 to form the liquid crystal layer 9, and then the liquid crystal layer 9 is sealed. In such a manner, the electro-optical device 100 illustrated in FIG. 1 and FIG. 2 can be manufactured.

As described above, the method for manufacturing the electro-optical device 100 includes the first base member preparing step S10, the light-shielding body forming step S13, the wiring layer forming step S14, the pixel electrode forming step S15, and the circuit and other component forming step S17. In the first base member preparing step S10, the light-transmitting first base member 21 is prepared. In the wiring layer forming step S14, the TFT 25 is formed. In the pixel electrode forming step S15, the light-transmitting pixel electrode 28 electrically coupled to the TFT 25 is formed on the first base member 21. In the circuit and other component forming step S17, the driving circuit 112 configured to drive the TFT 25 is formed. In the light-shielding body forming step S13, the first light-shielding body 31 that comes into contact with the first base member 21, and the second light-shielding body 32 that comes into contact with the first base member 21 are formed. Further, in the light-shielding body forming step S13, the first light-shielding body 31 is formed overlapping the TFT 25 in plan view from the thickness direction of the first base member 21. Further, the second light-shielding body 32 is formed overlapping the driving circuit 112 in plan view. Then, in the light-shielding body forming step S13, the first light-shielding body 31 and the second light-shielding body 32 are formed so that the first thickness D10 and the second thickness D20 are different from each other.

With one of the first thickness D10 and the second thickness D20 being formed thicker than the other, an increase in the stress generated in the first base member 21 can be suppressed compared to when both are thickly formed. As a result, according to the electro-optical device 100, the thickness is adjusted in accordance with the location where the light shielding property is to be enhanced, making it possible to suppress an increase in the warping of the first base member 21 while enhancing the light shielding property with respect to the location. Further, the occurrence of cracks and the like in the first light-shielding body 31 and the second light-shielding body 32 can be suppressed.

Further, as described above, the first base member preparing step S10 includes the second recessed portion forming step S11 and the first recessed portion forming step S12. Specifically, as described above, the second recessed portion 212 and the recessed portion 219 are formed by etching using the hard mask 51 including the opening 511 and the opening 512. Subsequently, the resist mask 52 that fills the opening 512 and the second recessed portion 212 is formed on the hard mask 51. Subsequently, the first recessed portion 211 is formed by deepening the depth of the recessed portion 219 by etching using the hard mask 51 and the resist mask 52. According to such a method, by using the hard mask 51 and the opening 52 to perform etching, it is possible to deepen the depth of the recessed portion 219 while maintaining the shape of the second recessed portion 212. Thus, the first recessed portion 211 having a depth deeper than the depth of the second recessed portion 212 can be easily formed. Further, in the formation of the first recessed portion 211, the hard mask 51 used in forming the recessed portion 219 is used as is without being peeled. Therefore, when the depth of the recessed portion 219 is deepened to form the first recessed portion 211, displacement in the x-y plane can be prevented.

Further, as described above, the bottom surface 2111 of the first recessed portion 211 is flat. As described above, by using the hard mask 51 used in forming the recessed portion 219 as is without the hard mask 51 being peeled, it is possible to prevent the occurrence of displacement in the x-y plane. Thus, a flat bottom surface 2111 can be easily formed.

1-2. Second Exemplary Embodiment

Figure 16:
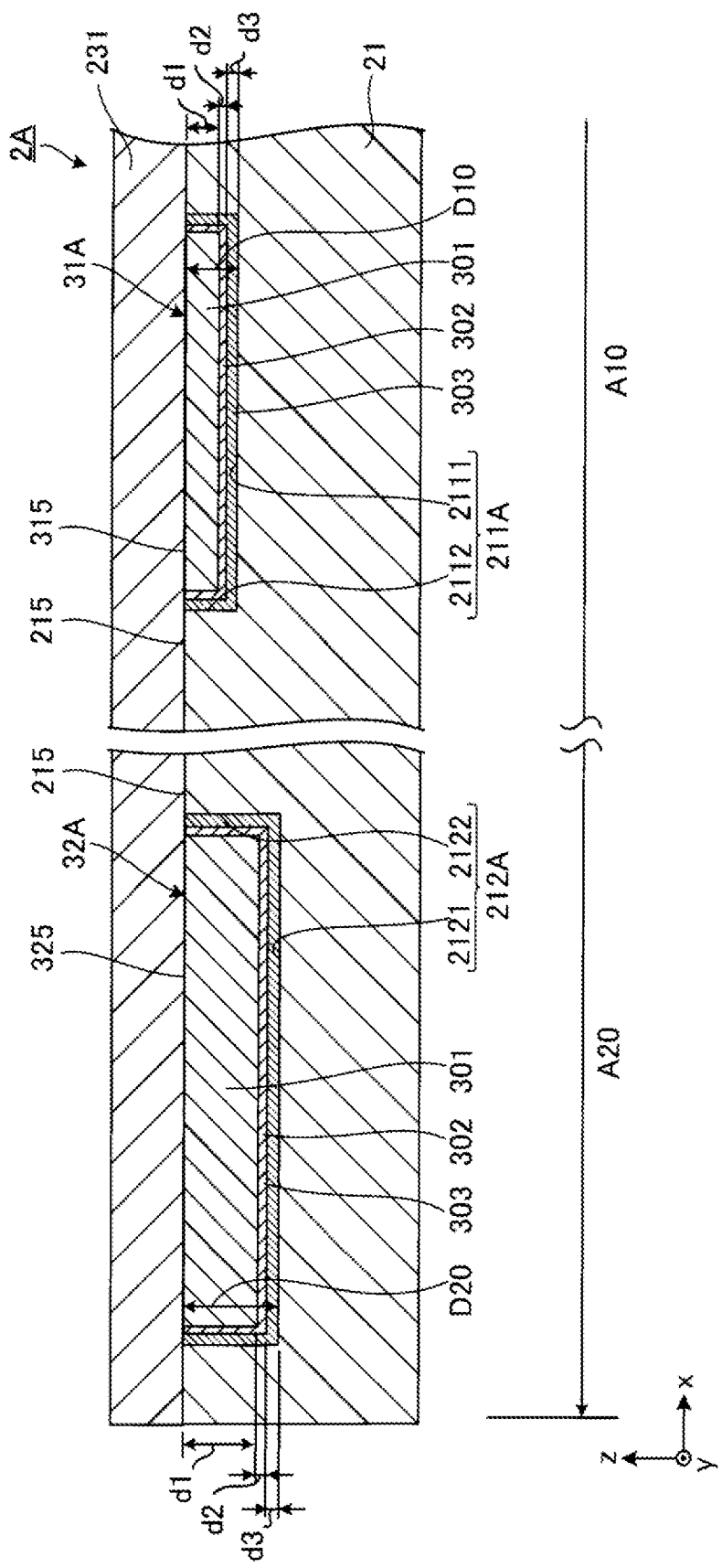
FIG. 16 is a partial cross-sectional view of an element substrate in a second exemplary embodiment.
Figure 17:
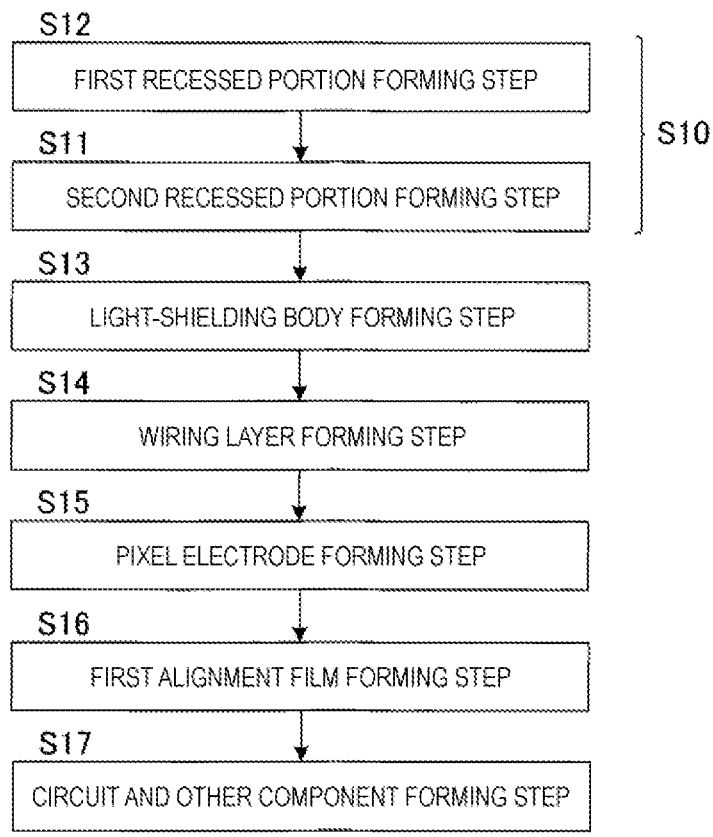
FIG. 17 is a flowchart illustrating a method for manufacturing an element substrate in the second exemplary embodiment.
Figure 18:
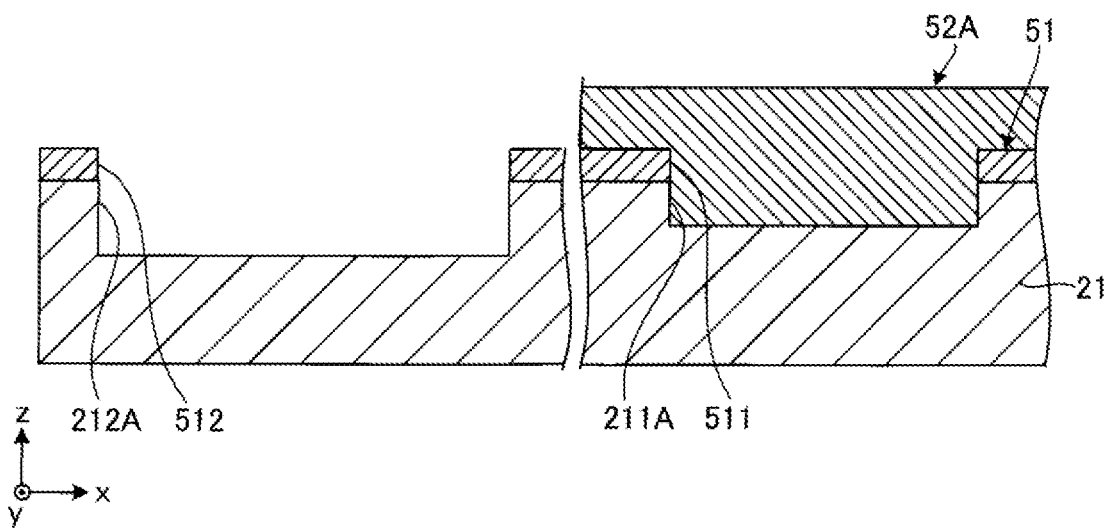
FIG. 18 is a cross-sectional view for explaining a second recessed portion forming step of the second exemplary embodiment.

Next, a second exemplary embodiment of the present disclosure will be described. FIG. 16 is a partial cross-sectional view of an element substrate 2A according to the second exemplary embodiment. FIG. 17 is a flowchart illustrating a method for manufacturing the element substrate 2A according to the second exemplary embodiment. FIG. 18 is a cross-sectional view for explaining the second recessed portion forming step S11 of the second exemplary embodiment. The present exemplary embodiment differs from the first exemplary embodiment in the configuration of the element substrate 2A. Note that, in the second exemplary embodiment, a sign used in the description of the first exemplary embodiment is used for the same matter as that of the first exemplary embodiment, and each detailed description thereof will be appropriately omitted.

In a first base member 21A of the element substrate 2A illustrated in FIG. 16, a depth of the second recessed portion 212A is deeper than a depth of the first recessed portion 211A. Thus, the second thickness D20 of a second light-shielding body 32A is greater than the first thickness D10 of a first light-shielding body 31A. Therefore, compared to when the second thickness D20 is thinner than the first thickness D10, the light shielding property with respect to the driving circuit 112 can be enhanced. Although not illustrated, when, for example, any wiring or the like is disposed between the first light-shielding body 31 and the TFT 25 and the any wiring or the like overlaps in plan view with the TFT 25, the incidence of the light LL on the TFT 25 can be blocked by the any wiring or the like and the first light-shielding body 31. Thus, in this case, for example, the second thickness D20 is made thicker than the first thickness D10. As a result, the light shielding property with respect to the driving circuit 112 can be enhanced by the second light-shielding body 32A, and the incidence of the light LL on the TFT 25 can be suitably suppressed. In this way, the thickness is adjusted in accordance with the location where the light shielding property is to be enhanced, making it possible to suppress an increase in the warping of the first base member 21 while enhancing the light shielding property with respect to the location.

As illustrated in FIG. 17, in the method for manufacturing the element substrate 2A in the present exemplary embodiment, the second recessed portion forming step S11 is performed after the first recessed portion forming step S12. Further, in the present exemplary embodiment, as illustrated in FIG. 18, in the second recessed portion forming step S11, a resist mask 52A that fills the first recessed portion 211A and the opening 511 is formed on the hard mask 51. Then, by using the hard mask 51 and the resist mask 52A to perform etching, it is possible to form the second recessed portion 212A deeper than the depth of the first recessed portion 211A while maintaining the shape of the first recessed portion 211A.

1-3. Modification Example

Each of the exemplary embodiments exemplified in the above can be variously modified. Specific modification aspects applied to each of the embodiments described above are exemplified below. Two or more modes freely selected from exemplifications below can be appropriately used in combination as long as mutual contradiction does not arise.

1-3a. First Modification Example

Figure 19:
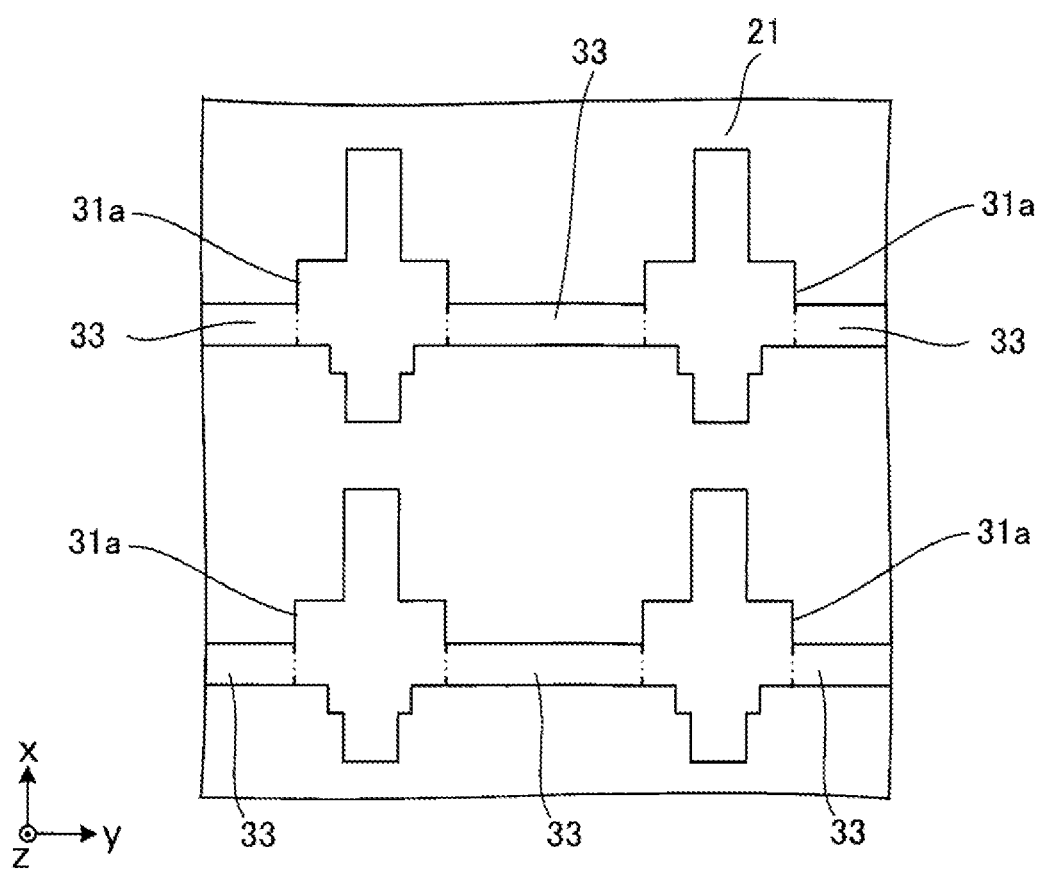
FIG. 19 is a plan view illustrating a first light-shielding body in a first modification example.

FIG. 19 is a plan view illustrating the first light-shielding body 31*a* in the first modification example. The first light-shielding bodies 31*a* adjacent to each other may be coupled by a coupling portion 33 that couples the first light-shielding bodies 31*a* to each other. A plurality of the first light-shielding bodies 31*a* and a plurality of the coupling portions 33 thus coupled can be used as scanning lines. Note that the plurality of first light-shielding bodies 31*a* and the plurality of coupling portions 33 may be regarded as one "first light-shielding body." Note that, although not illustrated, a plurality of "second light-shielding bodies" may also be coupled by a plurality of coupling portions in this same way.

1-3b. Second Modification Example

The first recessed portion 211 and the second recessed portion 212 in the first exemplary embodiment are each not limited to the shapes illustrated in FIG. 8. For example, the first recessed portion 211 and the second recessed portion 212 may each have a continuously widening shape, that is, a tapered shape, toward the +z axis side. Thus, the first light-shielding body 31 and the second light-shielding body 32 may each have a tapered shape. Further, for example, the bottom surface 2111 of the first recessed portion 211 and the bottom surface 2121 of the second recessed portion 212 may each include a step. Thus, a contact surface of the first light-shielding body 31 with the bottom surface 2111 and a contact surface of the second light-shielding body 32 with the bottom surface 2121 may each have a step. Further, for example, the first light-shielding body 31 and the second light-shielding body 32 may each have rounded corners. Note that the same applies to the first recessed portion 211A and the second recessed portion 212A in the second exemplary embodiment.

1-3c. Third Modification Example

The first recessed portion 211 and the second recessed portion 212 may be omitted. The first light-shielding body 31 and the second light-shielding body 32 may be disposed protruding from the flat upper surface 215 of the first base member 21. Note that the same applies to the first recessed portion 211A and the second recessed portion 212A in the second exemplary embodiment.

1-5d. Fourth Modification Example

The first light-shielding body 31 and the second light-shielding body 32 each include the first metal film 301, the second metal film 302, and the third metal film 303. The second metal film 30, however, may be omitted. Further, in the first light-shielding body 31 and the second light-shielding body 32, the third metal film 303 may be omitted. Note that same applies to the first light-shielding body 31A and the second light-shielding body 32A.

1-5e. Fifth Modification Example

While in each of the foregoing exemplary embodiments, the "switching element" is the TFT 25, the "switching element" is not limited thereto. The "switching element" may be, for example, a metal-oxide-semiconductor field-effect transistor (MOSFET).

1-5f. Sixth Modification Example

While in each of the foregoing exemplary embodiments, the light LL is incident from the element substrate 2, the light LL may be incident from the counter substrate 4.

2. Electronic Apparatus

The electro-optical device 100 can be used in various electronic apparatuses.

Figure 20:
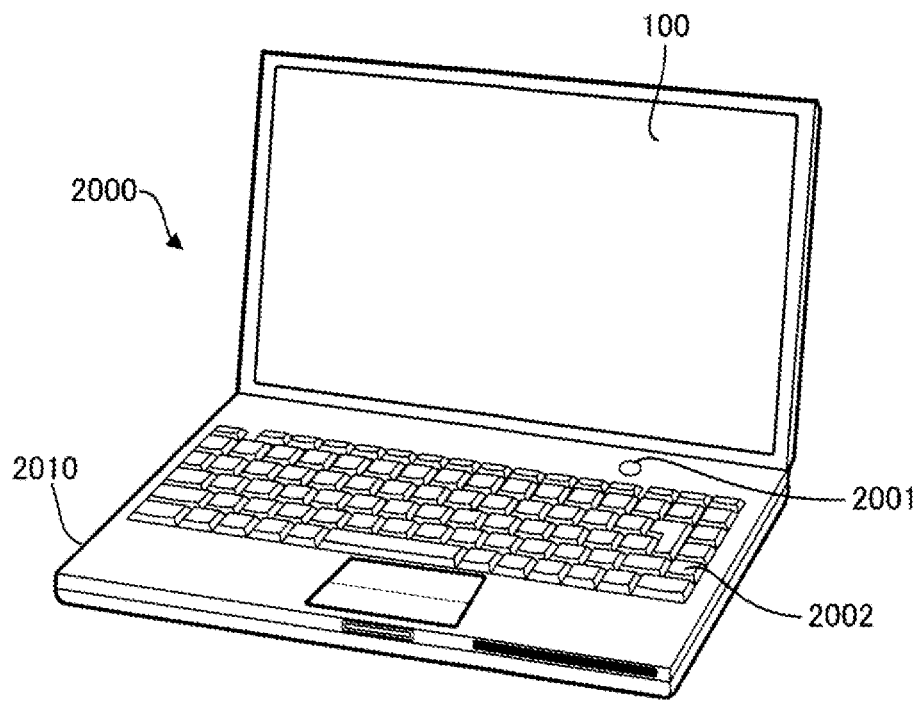
FIG. 20 is a perspective view illustrating a personal computer as an example of an electronic apparatus.

FIG. 20 is a perspective view illustrating a personal computer 2000 as an example of an electronic apparatus. The personal computer 2000 includes the electro-optical device 100 configured to display various images, and a main body portion 2010 in which a power source switch 2001 and a keyboard 2002 are installed.

Figure 21:
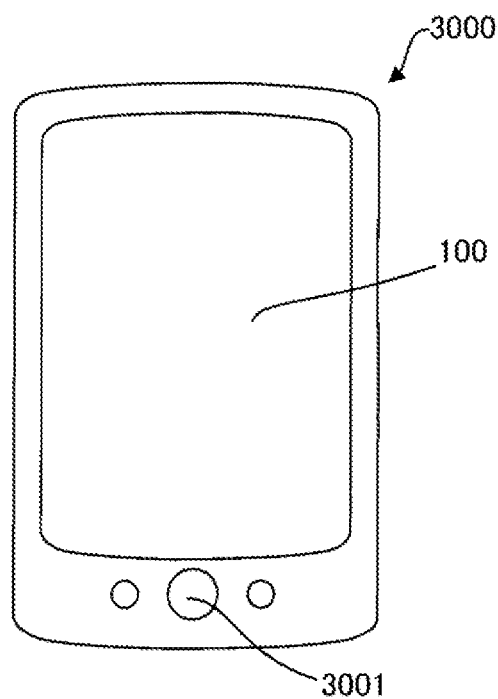
FIG. 21 is a perspective view illustrating a smart phone as an example of the electronic apparatus.

FIG. 21 is a perspective view illustrating a smart phone 3000 as an example of the electronic apparatus. The smart phone 3000 includes an operation button 3001 and the electro-optical device 100 configured to display various images. The screen content displayed on the electro-optical device 100 is changed in accordance with the operation of the operation button 3001.

Figure 22:
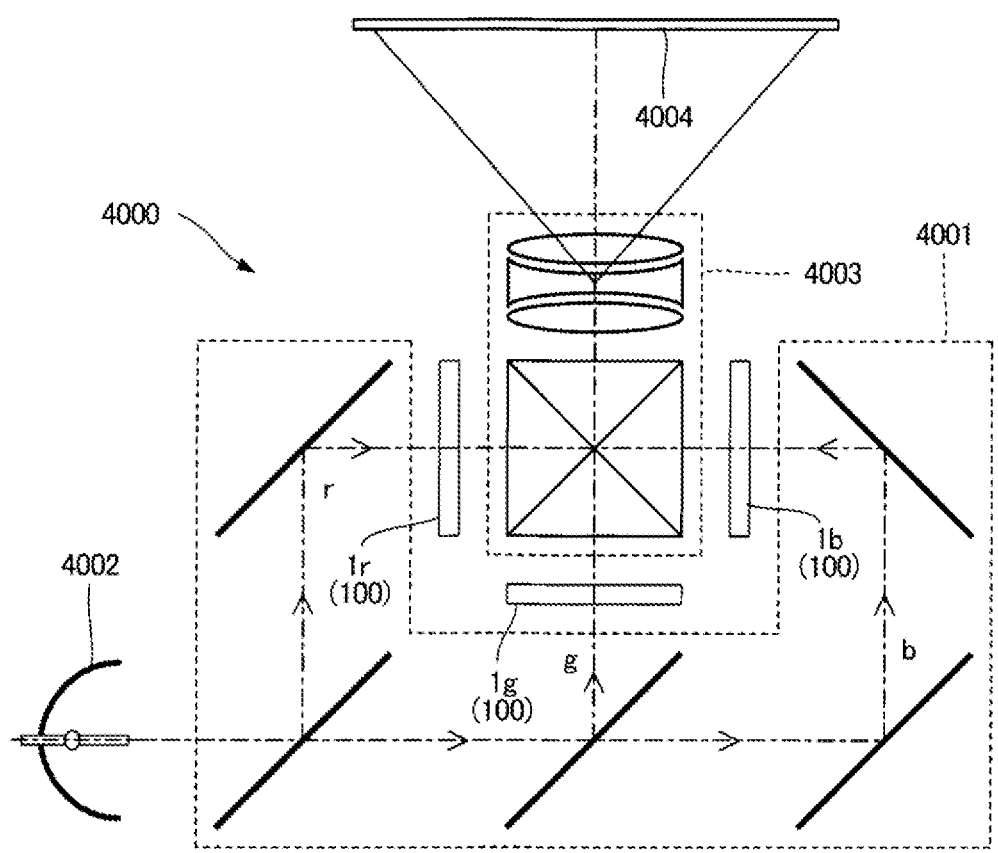
FIG. 22 is a schematic view illustrating a projector as an example of the electronic apparatus.

FIG. 22 is a schematic view illustrating a projector as example of the electronic apparatus. A projection-type display device 4000 is a three-plate type projector, for example. An electro-optical device 1*r* is an electro-optical device 100 corresponding to a red display color, an electro-optical device 1*g* is an electro-optical device 100 corresponding to a green display color, and an electro-optical device 1*b* is an electro-optical device 100 corresponding to a blue display color. Specifically, the projection-type display device 4000 includes the three electro-optical devices 1*r*, 1*g*, and 1*b* that respectively correspond to the display colors of red, green, and blue.

An illumination optical system 4001 supplies a red color component r of light emitted from an illumination device 4002 as a light source to the electro-optical device 1*r*, a green color component g of the light to the electro-optical device 1*g*, and a blue color component b of the light to the electro-optical device 1*b*. Each of the electro-optical devices 1*r*, 1*g*, and 1*b* functions as an optical modulator, such as a light bulb, that modulates respective rays of the monochromatic light supplied from the illumination optical system 4001 depending on display images. A projection optical system 4003 combines the rays of the light emitted from each of the electro-optical devices 1r, 1g, and 1b to project the combined light to a projection surface 4004.

The personal computer 2000, the smart phone 3000, and the projection-type display device 4000 each include the above-described electro-optical device 100. With the electro-optical device 100 thus provided, the quality of each display in the personal computer 2000, the smart phone 3000, and the projection-type display device 4000 can be enhanced.

The present disclosure has been described above based on the preferred exemplary embodiments, but is not limited to the exemplary embodiments described above. In addition, the configuration of each component of the present disclosure may be replaced with any configuration that exerts the equivalent functions of the above-described exemplary embodiments, and to which any configuration may be added.

Note that, the electronic apparatus to which the electro-optical device according to the present disclosure is applied is not limited to the exemplified apparatuses. Other examples include a personal digital assistant (PDA), a digital still camera, a television, a video camera, a car navigation device, a display device for in-vehicle use, an electronic organizer, an electronic paper, an electronic calculator, a word processor, a workstation, a video phone, a point of sale (POS) terminal, and the like. Furthermore, examples of the electronic apparatus to which the present disclosure is applied include a printer, a scanner, a copier, a video player, a device provided with a touch panel, and the like.

Further, while in the description above a liquid crystal display device is described as an example of the electro-optical device of the present disclosure, the electro-optical device of the present disclosure is not limited thereto. For example, the electro-optical device of the present disclosure can also be applied to an image sensor or the like. Further, for example, the present disclosure can also be applied to a display panel using light-emitting devices such as organic electroluminescent (EL) devices, inorganic EL devices, and light-emitting polymers, similarly to the exemplary embodiments described above. Furthermore, the present disclosure can also be applied to an electrophoretic display panel that uses micro capsules each including colored liquid and white particles distributed in the liquid, similarly to the exemplary embodiments described above.

What is claimed is:

1. An electro-optical device comprising:
   a base material having translucency;
   a pixel electrode having translucency;
   a switching element electrically coupled to the pixel electrode; and
   a circuit configured to drive the switching element, wherein
   the base material includes
   a first recessed portion,
   a second recessed portion,
   a first light-shielding body disposed at the first recessed portion and overlapping the switching element in plan view from a thickness direction of the base material, and
   a second light-shielding body disposed at the second recessed portion and overlapping the circuit in the plan view,
   the first light-shielding body is separate from and spaced from the second light-shielding body, with at least a portion of the base material disposed in a space between the first light-shielding body and the second light-shielding body, and
   a thickness of the first light-shielding body and a thickness of the second light-shielding body are different from each other.

2. The electro-optical device according to claim 1, wherein the thickness of the first light-shielding body is greater than the thickness of the second light-shielding body.

3. The electro-optical device according to claim 1, wherein the thickness of the second light-shielding body is greater than the thickness of the first light-shielding body.

4. The electro-optical device according to claim 1, wherein the base material includes
   a display area in which the pixel electrode and the switching element are disposed and a peripheral area in which the circuit is disposed,
   the first recessed portion is disposed in a position overlapping the switching element in the plan view,
   the second recessed portion is disposed in a position overlapping the circuit in the plan view,
   the first light-shielding body is disposed in an interior of the first recessed portion, and
   the second light-shielding body is disposed in an interior of the second recessed portion.

5. The electro-optical device according to claim 4, wherein a bottom surface of the first recessed portion is flat.

6. The electro-optical device according to claim 4, wherein a bottom surface of the second recessed portion is flat.

7. An electronic apparatus, comprising the electro-optical device according to claim 1.

8. A method for manufacturing an electro-optical device, the method comprising:
   preparing a base material having translucency;
   forming a first recessed portion and a second recessed portion in the base material;
   forming a first light-shielding body at the first recessed portion and forming a second light-shielding body at the second recessed portion; and
   forming at the base material a pixel electrode having translucency, a switching element electrically coupled to the pixel electrode, and a circuit configured to drive the switching element, wherein
   the first light-shielding body overlaps the switching element in plan view from a thickness direction of the base material,
   the second light-shielding body overlaps the circuit in the plan view,
   the first light-shielding body is separate from and spaced from the second light-shielding body, with at least a portion of the base material disposed in a space between the first light-shielding body and the second light-shielding body, and
   a thickness of the first light-shielding body and a thickness of the second light-shielding body are different from each other.

9. The method for manufacturing an electro-optical device according to claim 8, wherein the first recessed portion and the second recessed portion are formed by etching using a hard mask.

10. The electro-optical device according to claim 1, wherein the first light-shielding body and the second light-shielding body each include an outermost film, a middle film and an innermost film, wherein the outermost film has a thickness greater than a thickness of the middle film, but has the thickness less than a thickness of the innermost film.

11. The method for manufacturing an electro-optical device according to claim 8, wherein the first light-shielding body and the second light-shielding body each include an outermost film, a middle film and an innermost film, wherein the outermost film has a thickness greater than a thickness of the middle film, but has the thickness less than a thickness of the innermost film.

12. The electro-optical device according to claim 1, wherein a depth of the first recessed portion and a depth of the second recessed portion are different from each other, and an upper surface of the first light-shielding body, an upper surface of the second light-shielding body and an upper surface of the base material are formed as a flat surface.

13. The method for manufacturing an electro-optical device according to claim 8, wherein a depth of the first recessed portion and a depth of the second recessed portion are different from each other, and an upper surface of the first light-shielding body, an upper surface of the second light-shielding body and an upper surface of the base material are formed as a flat surface.

* * * * *